US008165457B2

(12) United States Patent  (10) Patent No.: US 8,165,457 B2
Shibutani et al.  (45) Date of Patent: Apr. 24, 2012

(54) RECORDING METHOD, REPRODUCING METHOD, RECORDING APPARATUS, AND REPRODUCING APPARATUS OF DIGITAL STREAM

(75) Inventors: Manabu Shibutani, Kawasaki (JP); Hiroyuki Kamio, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1066 days.

(21) Appl. No.: 12/047,715

(22) Filed: Mar. 13, 2008

(65) Prior Publication Data

US 2008/0240679 A1  Oct. 2, 2008

(30) Foreign Application Priority Data

Mar. 29, 2007 (JP) ................................. 2007-086126

(51) Int. Cl.
 *H04N 5/917* (2006.01)
(52) U.S. Cl. ........ 386/330; 386/331; 386/332; 386/334; 725/32; 725/39; 725/131; 725/139
(58) Field of Classification Search .................. 386/330, 386/331, 332, 334; 725/32, 39, 131, 139
 See application file for complete search history.

(56) References Cited

U.S. PATENT DOCUMENTS

| | | | |
|---|---|---|---|
| 6,986,159 B1 * | 1/2006 | Shimoji et al. ................ 725/142 |
| 2001/0009567 A1 * | 7/2001 | Tsuboi ..................... 375/240.25 |
| 2001/0012438 A1 * | 8/2001 | Ando et al. ..................... 386/65 |
| 2001/0012443 A1 * | 8/2001 | Ando et al. ..................... 386/98 |
| 2001/0014058 A1 * | 8/2001 | Ando et al. ..................... 369/32 |
| 2001/0014070 A1 * | 8/2001 | Ando et al. ................ 369/59.25 |
| 2001/0014201 A1 * | 8/2001 | Ando et al. ..................... 386/40 |
| 2002/0012528 A1 * | 1/2002 | Ando et al. ..................... 386/95 |
| 2002/0024892 A1 * | 2/2002 | Ando et al. ................ 369/30.25 |
| 2002/0057889 A1 * | 5/2002 | Ando et al. ..................... 386/1 |
| 2002/0150381 A1 * | 10/2002 | Ando et al. ..................... 386/46 |
| 2003/0043847 A1 * | 3/2003 | Haddad ....................... 370/473 |
| 2003/0059196 A1 * | 3/2003 | Ando et al. ..................... 386/20 |
| 2003/0059206 A1 * | 3/2003 | Ando et al. ..................... 386/95 |
| 2003/0059207 A1 * | 3/2003 | Ando et al. ..................... 386/95 |
| 2003/0059208 A1 * | 3/2003 | Ando et al. ..................... 386/95 |
| 2003/0170008 A1 * | 9/2003 | Ohiro et al. ................... 386/111 |
| 2004/0027393 A1 * | 2/2004 | Kato et al. .................... 345/838 |
| 2004/0114909 A1 * | 6/2004 | Seo et al. ........................ 386/95 |

(Continued)

FOREIGN PATENT DOCUMENTS

JP  2004-295947 A  10/2004

(Continued)

OTHER PUBLICATIONS

Japanese Office Action dated Mar. 29, 2011. Japanese Office Action dated Nov. 15, 2011.

*Primary Examiner* — David García Cervetti
(74) *Attorney, Agent, or Firm* — Pillsbury Winthrop Shaw Pittman, LLP

(57) ABSTRACT

According to one embodiment, this invention allows to acquire attribute information of a stream object and to generate it as management information upon recording a digital stream when an MPEG-TS that uses H.264 as a moving picture encoding format is to be recorded. Information is acquired from a component descriptor, a PES packet header, or a sequence parameter set in a program map table included in the digital stream signal, and video attribute information of the object and/or attribute information of the data unit is determined. The object is recorded for each data unit, and management information that manages the recorded is recorded.

4 Claims, 24 Drawing Sheets

U.S. PATENT DOCUMENTS

| | | | |
|---|---|---|---|
| 2004/0223742 A1* | 11/2004 | Ando et al. | 386/95 |
| 2004/0240859 A1* | 12/2004 | Karimoto et al. | 386/111 |
| 2005/0019016 A1* | 1/2005 | Nakashika et al. | 386/95 |
| 2005/0022227 A1* | 1/2005 | Shen et al. | 725/28 |
| 2005/0069289 A1* | 3/2005 | Kusunoki | 386/52 |
| 2005/0100322 A1* | 5/2005 | Kikuchi et al. | 386/95 |
| 2005/0152256 A1* | 7/2005 | Kikuchi et al. | 369/59.25 |
| 2005/0283819 A1* | 12/2005 | Shimoji et al. | 725/142 |
| 2006/0034591 A1* | 2/2006 | Ando et al. | 386/95 |
| 2006/0036621 A1* | 2/2006 | Ando et al. | 707/100 |
| 2006/0064716 A1* | 3/2006 | Sull et al. | 725/37 |
| 2006/0083485 A1* | 4/2006 | Kikuchi | 386/95 |
| 2006/0120693 A1* | 6/2006 | Kikuchi et al. | 386/95 |
| 2006/0182418 A1* | 8/2006 | Yamagata et al. | 386/95 |
| 2006/0204219 A1* | 9/2006 | Kamio | 386/95 |
| 2007/0121940 A1* | 5/2007 | Park et al. | 380/201 |
| 2007/0274672 A1* | 11/2007 | Itoi | 386/46 |
| 2008/0049574 A1* | 2/2008 | Yahata | 369/47.13 |
| 2008/0205215 A1* | 8/2008 | Kikuchi et al. | 369/47.15 |
| 2008/0240679 A1* | 10/2008 | Shibutani et al. | 386/95 |
| 2008/0259173 A1* | 10/2008 | Yahata | 348/220.1 |
| 2009/0010621 A1* | 1/2009 | Yahata et al. | 386/126 |
| 2009/0103892 A1* | 4/2009 | Hirayama et al. | 386/83 |
| 2010/0208856 A1* | 8/2010 | Fuchikami et al. | 375/371 |

FOREIGN PATENT DOCUMENTS

| | | |
|---|---|---|
| JP | 2006-302346 | 11/2006 |
| WO | WO 2005/120060 | 12/2005 |

* cited by examiner

⟨Configuration example of ESOBU_ENT of TYPE A (PTM base)⟩

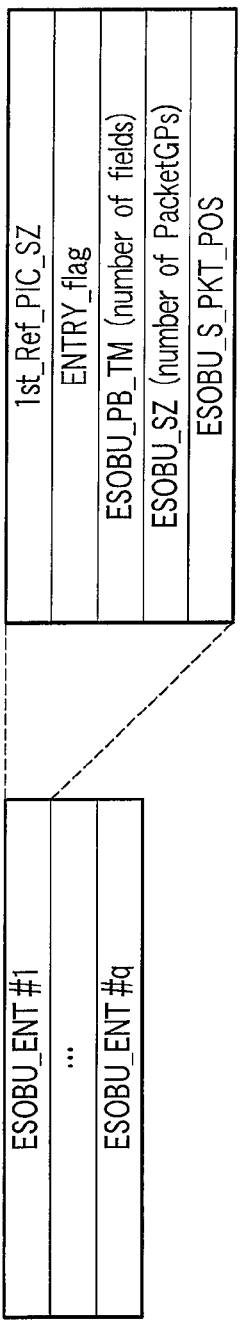

| ESOBU_ENT #1 |
| ... |
| ESOBU_ENT #q |

| 1st_Ref_PIC_SZ |
| ENTRY_flag |
| ESOBU_PB_TM (number of fields) |
| ESOBU_SZ (number of PacketGPs) |
| ESOBU_S_PKT_POS |

ESOBU_SZ : number of packet groups belonging to SOBU (count head fractions, and drop rear fractions)
ESOBU_S_PKT_POS : first packet number of start ESOBU in packet group
(0≦ESOBU_S_PKT_POS≦PKT_Ns-1)

Example

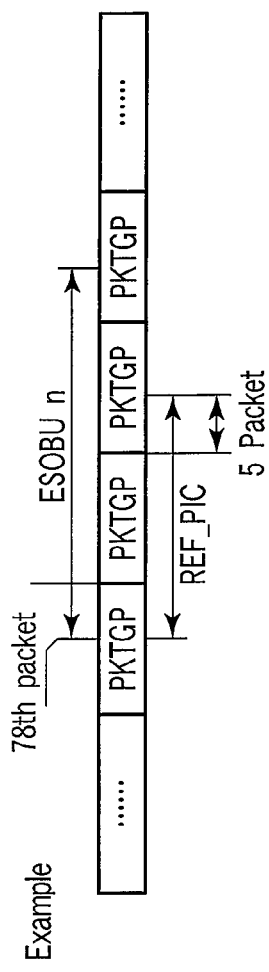

* 1st_Ref_PIC_SZ : number of Packet Groups (or number of Packets) from head of ESOBU to end of Ref_PIC. When 1st_Ref_PIC_SZ=0x000000, ESOBU does not include any Ref_PIC. Set 0 for Non-Entry ESOBU and Non-Intra ESOBU
* REF_PIC : I_PIC for MPEG_2, or corresponding picture for other compression methods.
* ENTRY_flag : 0xff for Non-Intra ESOBU, 0x00 for Non-Entry ESOBU, other values for other cases (Set for frame or field.)

F I G. 12

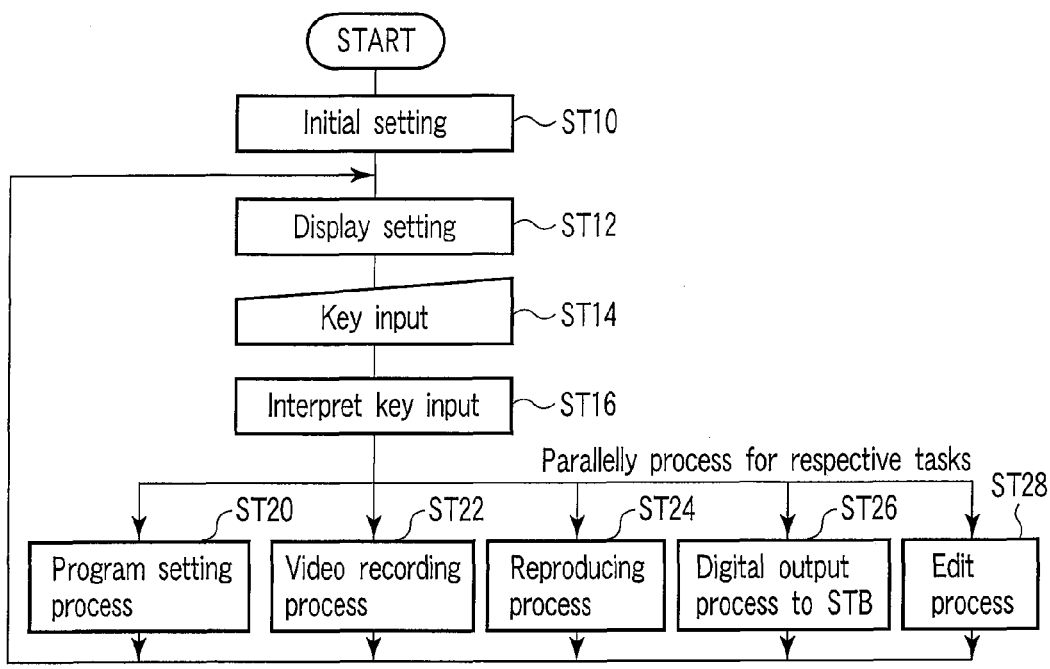
F I G. 14
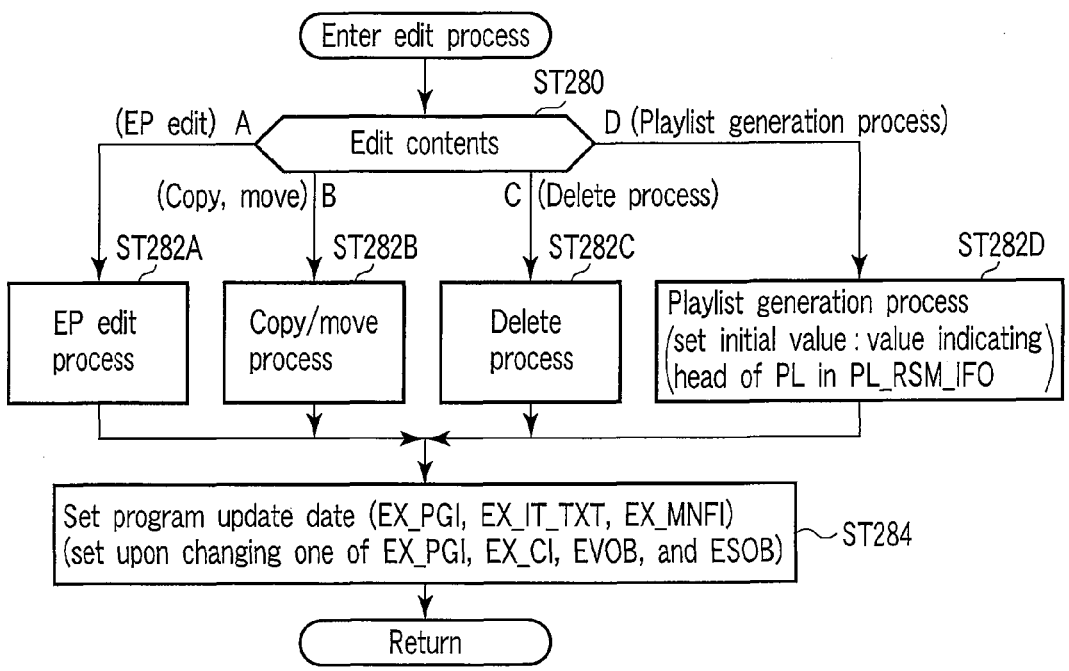
F I G. 15

PPH···PES packet header
PTS···Presentation Time Stamp (Playback start time)

<Values of Navigation Date for Japanese ISDB>

| | Navigation Data Field Name | Value |
|---|---|---|
| ESTR_FI_SRP | FILE_NAME | "HR_SFI01.IFO" |
| | AP_FORMAT1 | 0001 0001h : Japanese ISDB |
| | COUNTRY_CODE | "JPN" |
| | "reserved for each application format" | shall be filled with '00h' |
| ESTR_FI_GI | ESTR_FI_EXT_EA | 0000 0000h : no ESTR_FI_EXT exists |
| | ESOB_TY/SOBU_MODE | 00b : no Non-Intra ESOBU exists |
| | ESOB_TY/Video system | 0000b : 59.94Hz Video system |
| | AP_FORMAT2 | 0001h : ISDB-S<br>0002h : ISDB-T<br>Others : reserved |
| ESOBI_GI | NETWORK_ID | (original_network_id) |
| | TS_ID | (transport_stream_id) |
| | SERVICE_ID | (service_id) |
| | FORMAT_ID | 0000 0000h : not available |
| | SERVICE_TYPE | (service_type) |
| ESOB_ESI | ES_INDEX | (component_tag) |

FIG. 24

⟨Values of Navigation Date for US ATSC and Cable⟩

| | Navigation Data Field Name | Value |
|---|---|---|
| ESTR_FI_SRP | FILE_NAME | "HR_SFI02.IFO" |
| | AP_FORMAT1 | 0002 0001h : US ATSC and Cable |
| | COUNTRY_CODE | "USA" |
| | "reserved for each application format" | shall be filled with 00h |
| ESTR_FI_GI | ESTR_FI_EXT_EA | 0000 0000h : no ESTR_FI_EXT exists |
| | ESOB_TY/SOBU_MODE | 00b : no Non-Intra ESOBU exists<br>01b : Non-Intra ESOBU may exist |
| | ESOB_TY/Video system | 0000b : 59.94Hz Video system<br>0001b : 60.00Hz Video system |
| | AP_FORMAT2 | 0001h : ATSC (terrestrial)<br>0002h : US Cable<br>Others : reserved |
| ESOBI_GI | NETWORK_ID | If VCT exists, source_id in VCT shall be described<br>If VCT does not exist, FFFFh shall be described |
| | TS_ID | (transport_stream_id) |
| | SERVICE_ID | (program_number) |
| | FORMAT_ID | If registration descriptor exists, the value of format_identifier shall be described.(e.g. "GA94", "SCTE" or "CUEI")<br>If registration_descriptor does not exist, 0000 0000h : not available shall be described |
| | SERVICE_TYPE | If VCT exists, service_type in VCT shall be described in the lower 6 bits and 00b shall be described in the upper 2 bits.<br>If VCT does not exist, FFh shall be described |
| ESOB_ESI | ES_INDEX | A unique value shall be assigned to each elementary stream in the ESOB |

F I G. 25

⟨Values of Navigation Date for Manufacturer mode⟩

| | Navigation Data Field Name | Value |
|---|---|---|
| ESTR_FI_SRP | FILE_NAME | "HR_SFInn.IFO" (nn : F0-FF) |
| | AP_FORMAT1 | 0000 0000h : Manufacturer Mode |
| | COUNTRY_CODE | Country code (in ISO3166) may be described (If this field is not available, enter FF FFFFh) |
| | MNF_ID | Manufacturer ID (mandatory) |
| | APP_ID | Application ID (optional) (If this field is not available, enter 0000 0000h) |
| ESTR_FI_GI | ESTR_FI_EXT_EA | If ESTR_FI_EXT exists, this field shall be described properly If ESTR_FI_EXT does not exists, 0000 0000h shall be described property |
| | ESOB_TY/SOBU_MODE | 00b : no Non-Intra ESOBU exists 01b : Non-Intra ESOBU may exist |
| | ESOB_TY/Video system | 0000b, 0001b or 0010b |
| | AP_FORMAT2 | Defined by each manufacturer (If this field is not available, enter FFFFh) |
| | NETWORK_ID | original_network_id, unless otherwise specified by each manufacturer (If this field is not available, enter FFFFh) |
| ESOBI_GI | TS_ID | transport_stream_id, unless otherwise specified by each manufacturer (If this field is not available, enter FFFFh) |
| | SERVICE_ID | program_number, unless otherwise specified by each manufacturer (If this field is not available, enter FFFFh) |
| | FORMAT_ID | If registration_descriptor exists, the value of format_identifier shall be described If registration_descriptor does not exist, 0000 0000h : not available shall be described |
| | SERVICE_TYPE | service_type or equivalent value, unless otherwise specified by each manufacturer (If this field is not available, enter FFh) |
| ESOB_ESI | ES_INDEX | A unique value shall be assigned to each elementary stream in the ESOB |

F I G. 26

RECORDING METHOD, REPRODUCING METHOD, RECORDING APPARATUS, AND REPRODUCING APPARATUS OF DIGITAL STREAM

CROSS-REFERENCE TO RELATED APPLICATIONS

This application is based upon and claims the benefit of priority from Japanese Patent Application No. 2007-086126, filed Mar. 29, 2007, the entire contents of which are incorporated herein by reference.

BACKGROUND

1. Field

One embodiment of the present invention relates to information recording and reproducing methods, and information recording and reproducing apparatuses, which are suited to record and reproduce a digital stream signal (MPEG-TS) and the like used in satellite digital TV broadcasting, terrestrial digital TV broadcasting, and the like.

More particularly, the invention relates to recording and reproducing methods, and recording and reproducing apparatuses of a digital stream signal compatible to an MPEG-TS including video data encoded by MPEG-4 AVC (or H.264).

2. Description of the Related Art

In recent years, TV broadcasting has entered the era of digital broadcasting having Hi-Vision programs (programs of high-definition AV information) as principal broadcasting content. The current BS digital broadcasting (and forthcoming terrestrial digital broadcasting) adopts an MPEG2 transport stream (to be abbreviated as MPEG-TS hereinafter as needed). In the field of digital broadcasting using moving pictures, the MPEG-TS will be used as a standard format in the future. Upon the initiation of such digital TV broadcasting, market needs for a streamer that can directly record digital TV broadcasting content are increasing. As an example of such streamer, one disclosed in JP-A 2004-295947 (KOKAI) is known.

This application proposes that a digital stream signal compatible to the MPEG-TS is handled as a stream object. Also, this application proposes that attribute information associated with the stream object is generated as management information and is recorded upon recording of the stream object, so as to realize high random accessibility upon reproducing the stream object. Furthermore, this application takes, as a practical example of a digital stream signal to be recorded, ARIB (Association of Radio Industries and Businesses) as the digital broadcasting standard in Japan. As other digital broadcasting standards, DVB (Digital Video Broadcasting) in Europe and ATSC (Advanced Television Systems Committee) in U.S.A. are known. These broadcasting standards adopt a digital stream signal compatible to the MPEG-TS.

The MPEG-TS is data obtained by appending synchronization data and the like to moving picture data, audio data, and the like, and multiplexing them, and moving picture and audio data to be multiplexed in the MPEG-TS can use some encoding formats. The practical examples of the digital stream signal adopt MPEG-2 Video as the moving picture encoding format. When the streamer records the MPEG-TS multiplexed with MPEG-2 Video data, it needs to demultiplex the MPEG-2 Video data from the MPEG-TS, and acquire attribute information by cognizing (or analyzing) the MPEG-2 Video structure so as to generate the attribute information of the stream object as management information.

On the other hand, in recent years, H.264/MPEG4-AVC (to be abbreviated as H.264 hereinafter as needed) has received a lot of attention as a novel moving picture encoding format. H.264 can attain moving picture encoding at a compression ratio higher than MPEG-2 Video, and draws attention as a moving picture encoding scheme in digital broadcasting and that used upon saving in the streamer. However, as is known, the H.264 structure is harder to cognize than MPEG-2 Video. Therefore, upon recording the MPEG-TS multiplexed with H.264 data by the streamer, it is difficult for the streamer to obtain attribute information by cognizing the deep part of the H.264 structure.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 12 is an exemplary view for explaining an example of the configuration of entry information (ESOBU_ENT of type A) of a data unit as a part of management information;

FIG. 14 is an exemplary flowchart (overall operation processing sequence) for explaining an example of the overall operation of the apparatus;

FIG. 15 is an exemplary flowchart (edit operation processing sequence) for explaining an example of edit processing;

FIG. 24 shows a practical example of navigation data for ISDB (a part of management information) of Japan;

FIG. 25 shows a practical example of navigation data for ATSC and cable distribution (a part of management information) used in U.S.A.; and FIG. 26 shows a practical example of navigation data for a manufacturer mode (a part of management information).

DETAILED DESCRIPTION

Figure 1:
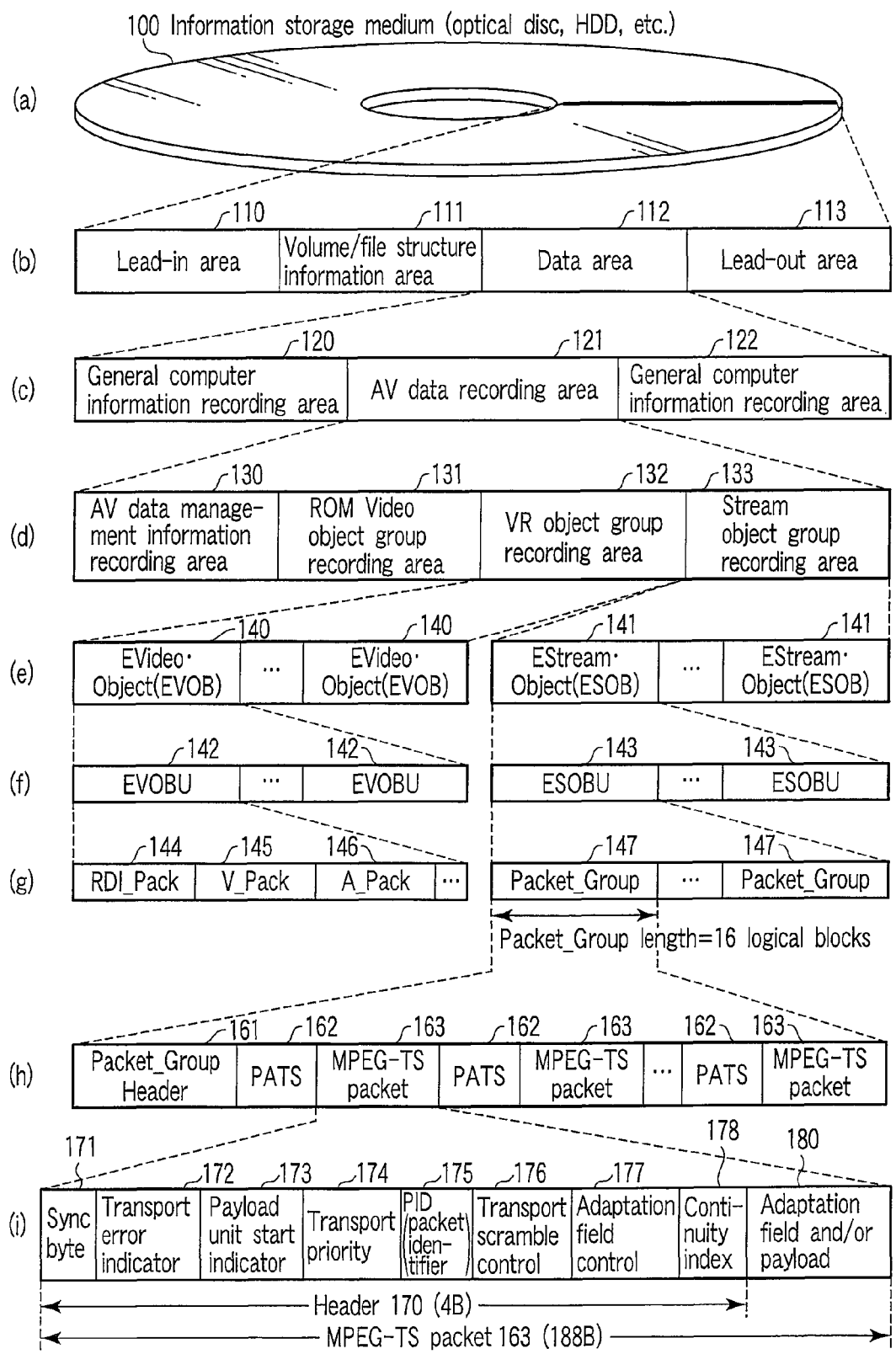
FIG. 1 is an exemplary view for explaining the data structure according to an embodiment.

Various embodiments according to the invention will be described hereinafter with reference to the accompanying drawings. In general, according to one embodiment of the invention, One aspect of the invention is to acquire attribute information of a stream recording and to generate the attribute information as management information upon recording a digital stream when an MPEG-TS that uses H.264 as a moving picture encoding format is to be recorded.

Data of a digital stream signal compatible to the MPEG transport stream is segmented into one or more objects (ESOBs), each object (ESOB) includes a data unit (ESOBU) which is configured with reference to one or more picture access units or is configured by data of predetermined seconds (2.002 seconds) or shorter, and one data unit (ESOBU) is configured by a pack group obtained by grouping a plurality of transport stream packets. In this case, a recording medium (optical disc, HDD, or the like) which is configured to have a data area that records a digital stream signal including MPEG-4 AVC or H.264 video data as a digital stream signal compatible to the MPEG transport stream, and a management area that records management information (HDVR_MG in FIG. 3 including ESTR_FIT) of this data area is prepared. In a recording method using this recording medium, information is acquired from component descriptors in a program map table (PMT), a PES packet header, or a sequence parameter set, which are included in the digital stream signal, to determine video attribute information (V_ATR) of the object and/or attribute information (ESOBU_ENT) of the data unit. The object (ESOB) is recorded on the data area for each data unit (ESOBU), and management information (HDVR_MG) that manages the object (ESOB) recorded on the data area is recorded on the management area.

Upon recording an MPEG-TS that uses H.264 as the moving picture encoding format, attribute information of a stream object is acquired and can be generated as management information upon recording a digital stream. This allows flexible management of the MPEG-TS that uses H.264 (MPEG-4 AVC) as the moving picture encoding format. More specifically, one embodiment can realize high random accessibility, e.g., upon reproducing a digital stream.

Various embodiments will be described hereinafter with reference to the accompanying drawings. An MPEG-TS scheme as a basic format common to broadcasting schemes which broadcast (distribute) compressed moving picture data such as digital TV broadcasting, broadcasting that uses a wired network such as the Internet or the like, and so on is divided into a packet management data field and payload. The payload includes data to be reproduced in a scrambled state. According to ARIB, a PAT (Program Association Table), a PMT (Program Map Table), and SI (Service Information) are not scrambled. Also, various kinds of management information are generated using the PMT and the SI (SDT: Service Description Table, EIT: Event Information Table, BAT: Bouquet Association Table). The content to be reproduced includes MPEG video data, Dolby AC3 audio data, MPEG audio data, data broadcasting data, and the like. Also, the content includes information needed upon reproduction such as a PAT, a PMT, SI, and the like (program information etc.) although they are not directly related to the content to be reproduced. The PAT includes the PID (Packet Identification) of the PMT for each program, and the PMT records the PIDs of video data and audio data.

A normal reproducing sequence of an STB (Set Top Box) is as follows. That is, when the user determines a program using electronic program guide information (EPG information), the PAT is loaded at the start time of the target program. The PID of a PMT, which belongs to the desired program, is determined based on that data. The target PMT is read out in accordance with that PID, and the PIDs of video and audio packets to be reproduced, which are included in the PMT, are determined. Video and audio attributes are read out based on the PMT and SI and are set in respective decoders. The video and audio data are extracted and reproduced in accordance with their PIDs. Note that the PAT, PMT, SI, and the like are transmitted at intervals of several 100 ms since they are also used during reproduction. The standard for recording such stream (especially, a stream of satellite or terrestrial digital broadcasting) has been created as the HD_DVD-VR standard by the DVD forum, and a High-definition digital video recorder based on this standard is already commercially available.

Note that different digital broadcasting schemes are adopted in respective countries: for example, DVB (Digital Video Broadcasting) in Europe; ATSC (Advanced Television Systems Committee) in U.S.A.; and ARIB (Association of Radio Industries and Businesses) in Japan.

In DVB, the video format is MPEG-2, the resolutions are 1152*1440i, 1080*1920 (I, p), 1035*1920, 720*1280, (576, 480)*(720, 544, 480, 352), and (288, 240)*352, the frame frequencies are 30 Hz and 25 Hz, the audio format includes MPEG-1 audio and MPEG-2 Audio, and the sampling frequencies are 32 kHz, 44.1 kHz, and 48 kHz.

In ATSC, the video format is MPEG-2, the resolutions are 1080*1920 (I, p), 720*1280p, 480*704 (I, p), and 480*640 (I, p), the frame frequencies are 23.976 Hz, 24 Hz, 29.97 Hz, 30

Hz, 59.94 Hz, and 60 Hz, the audio format includes MPEG1 Audio Layer 1 & 2 (DirecTV) and AC3 Layer 1 & 2 (Primstar), and the sampling frequencies are 48 kHz, 44.1 kHz, and 32 kHz.

In ATSC, there are several types of streams even in U.S.A., which include a stream without any I-picture. In such case, a display image is obtained by decoding a plurality of pictures. For example, in the case of MPEG-2, a plurality of P-pictures are prepared and decoded, thus reproducing a video picture, but display does not start until an image to be reproduced is prepared for one frame (in this case, since there is no I-picture, the image quality of an image to be displayed is low). Note that in the scheme such as MPEG-4 AVC, VC-1, or the like, a frame includes intra-blocks, and a plurality of their pictures are prepared and decoded, thereby reproducing a video picture.

In ARIB, the video format is MPEG-2, the resolutions are 1080i, 720p, 480i, and 480p, the frame rates are 29.97 Hz, 59.94 Hz, and 60 Hz, the audio format includes AAC (MPEG-2 Audio), and the sampling frequencies are 48 kHz, 44.1 kHz, 32 kHz, 24 kHz, 22.05 kHz, and 16 kHz.

In this manner, digital broadcasting schemes are different in different countries, and may also be different for respective broadcasting stations even within each country. For this reason, a recorder for recording digital broadcasting needs to record and manage video recording data (objects) as files in accordance with each individual digital broadcasting scheme to be used. In HD_DVD-VR, one or more management information files (HR_SFInn.IFO, HR_SFInn.bup: nn is an arbitrary integer) can exist, and a management information file can be added for one or more types of broadcasting schemes. If a broadcasting scheme is unknown or if a recorder does not support a given broadcasting scheme, nn=0, and data is stored as a type B stream (ESOB_STRB).

In MPEG, reproducing processing is executed focusing on I-pictures (Intra-Picture: intra-frame encoded image). This is because each I-picture can configure an image for one frame. However, some digital broadcasting schemes do not include any I-picture. In this case, a decoder which supports a case without any I-picture is needed. For this reason, identification information that identifies if a scheme allows the absence of an I-picture in an object (ESOB) is needed in terms of management of the recorded object.

For this reason, in the embodiment, information indicating whether or not a data unit (Non-Intra ESOBU) without any I-picture is included can be saved in an ESOB_TY/SOBU_MODE (see FIG. 6 etc.) in given management information (ESOB_GI). Note that a data unit including an I-picture (intra-frame encoded image) is called an Intra ESOBU (or simply ESOBU) and is distinguished from the Non-Intra ESOBU. In MPEG-4 AVC or VC-1, there is a Reference Picture corresponding to an I-picture. In the embodiment, both the I-picture of MPEG-2 and the reference picture of MPEG-4 AVC and the like are handled as reference pictures. That is, a data unit that does not include any reference picture of MPEG-4 AVC or the like is also handled as a Non-Intra ESOBU.

There are two types of content (recording objects) to be handled in HD_DVD-VR, i.e., an EVOB for analog broadcasting or an analog input and an ESOB for digital broadcasting. The ESOB is further classified into cognizable (or analyzable) content (TYPE_A_ESOB) and non-cognizable (or non-analyzable) content (TYPE_B_ESOB). Furthermore, the TYPE_A_ESOB is classified according to respective broadcasting schemes (JAPAN_ISDB, ARIB, DVB, and the like) and a manufacture mode, and is set with corresponding values according to the respective schemes and mode. The EVOB is created based on a PS (Program Stream), and the ESOB is created based on a TS (Transport Stream).

FIG. 1 is a view for explaining the data structure according to an embodiment. As a typical example of a Recordable or Re-writable information recording medium, a DVD disc (DVD±R, DVD±RW, DVD-RAM, or the like which has a single recording layer or multiple recording layers using a red laser of a wavelength around 650 nm or a blue-violet or blue laser of a wavelength of 405 nm or less) 100 is known. As shown in FIG. 1, this disc 100 is configured to include volume/file structure information area 111 that stores a file system, and data area 112 that actually records data files. The file system includes information indicating the recording locations of files.

Data area 112 includes areas 120 and 122 recorded by a general computer, and area 121 that records AV data. AV data recording area 121 is configured to include AV data management information area 130 that stores a video manager (VMG) file used to manage AV data, ROM_Video object group recording area 131 that records a file of object data complying with the DVD-Video (ROM Video) standard, VR object group recording area 132 that records a file (VRO file) of object data (EVOBS: Extended Video Object Set) complying with the video recording (VR) standard, and recording area 133 that records a stream object data (ESOBS: Extended Stream Object Set) file (SRO file) which records objects compatible to digital broadcasting. Note that the recording standard for the SRO file will be described as a stream recording (SR) standard as needed.

Note that different file directories are prepared in correspondence with formats (e.g., video title set (VIDEO-TS) for DVD-Video (ROM Video) and DVD-RTAV for recordable/reproducible DVD (DVD-RTR), and a new DVD standard file compatible to digital broadcasting to be described in this embodiment is recorded in, e.g., a DVD_HDVR directory. That is, the DVD_HDVR directory records a VMG file used to manage data, VRO files as object files for analog recording of analog broadcasting data, line-in data, and the like, and an SRO file as a digital broadcasting object. The SRO file records an ESOBS.

In the configuration shown in FIG. 1, one ESOBU 143 is configured by one or more Packet Groups 147. Each Packet Group 147 corresponds to, e.g., 16 (or 32) packs (1 pack=1 Logical Block: 2048 bytes), and is configured by Packet Group Header 161 and a plurality of TS packets 163 (170 packets). The Arrival Time of each TS packet can be expressed by PATS (Packet Arrival Time Stamp: 4 bytes) 163 allocated before that TS packet.

Packet Group Header 161 allocated at the head of Packet Group 147 is set with a Header_ID (0x00000FA5), and is configured to include packet group general information PKT_ GRP_GI, Copy Control Information CCI or Content Protection Information CPI, and Manufacturer's Information MNI or MNFI (none of them are shown).

The arrival times of TS packets need to be linearly counted up until a video recording end time to have a video recording start time as 0 (or a predetermined value). Note that an STC (System Time Counter) and the PATS may not always indicate the same value (due to different initial values or the like). However, the count interval of a PATS counter may be synchronized with that of an STC counter which corresponds to the interval between neighboring PCR (Program Clock Reference) fetch timings in a reproduction synchronized state. Note that the PCR is included in an adaptation field (not shown) in an MPEG-TS. A Packet Group can include a maximum of two ESOBs. That is, Packet Groups need not be aligned for respective ESOBs.

Note that the lower 4 bytes unique to each PATS are included in that PATS, but the upper 2 bytes of the first PATS are included in First_PATS_EXT described in the packet group general information (PKT_GRP_GI: not shown) in Packet Group Header 161. With this configuration, the data size can be reduced compared to a case wherein 6-byte packet arrival times are independently described in respective PATS data.

Although not shown, the PKT_GRP_GI includes packet group type PKT_GRP_TY (1=MPEG-TS), Packet Group version number VERSION, status information PKT_GRP_SS of the Packet Group, and the number Valid_PKT_Ns of valid packets in the Packet Group, upper 2 bytes FIRST_PATS_EXT of the PATS for the first packet, and the like.

Furthermore, the PKT_GRP_SS includes bit STUF indicating if stuffing is done (if this STUF bit is set, it indicates that the Valid_PKT_Ns assumes a value other than 0xAA), and PATS_SS. Note that the PATS_SS includes a value indicating the accuracy of the PATS (when PATS_SS=00, both PATS and FIRST_PATS_EXT are valid and accuracy=6 bytes is set; when PATS_SS=01, only PATS is valid and accuracy=4 bytes is set; and when PATS_SS=10, both PATS and FIRST_PATS_EXT are invalid and no accuracy is set).

Note that extended bytes FIRST_PATS_EXT of the PATS of the first packet include the upper 2 bytes of the arrival time of the packet allocated at the head of the packet group, and the remaining 4 bytes are assigned before each packet. In this manner, the reproducing processing with more accurate time is allowed, or more accurate reproduction processing is enabled, as regards timing.

Packet Group Header 161 includes a description location of CP_CTL_INFO (copy control information: to be abbreviated as CCI or CPI as needed) (not shown). The CP_CTL_INFO is stored in CCI (or CPI) or the like in Packet Group Header 161, and executes copy control of each Packet Group at the location of Packet Group Header 161. The values of this CCI (or CPI) are set by a digital copy control descriptor and content use descriptor. The contents of the CCI are: for example, CGMS (0=copy never; 1=copy free); APS (0=no APS, 1=append APS type 1, 2=append APS type 2, 3=append APS type 3); EPN (0=content protection (Internet output protection), 1=no content protection); and ICT (0=resolution constraint, 1=no constraint).

Alternatively, CCI (or CPI) includes digital copy control (00=copy never, 01=copy once, 11=copy free), analog copy control (00=no APS, 01=APS type 1, 10=APS type 2, 11=APS type 3), EPN (0=content protection, 1=no content protection), and ICT (0=analog video output resolution constraint, 1=no constraint). Note that APS is an abbreviation for "Analog Protection System", and this embodiment assumes Macrovision(R).

Also, the copy control information (CCI or CPI) is set on the management information side (ESOBI_GI) to perform copy management (copyright management) for the whole system, or the CCI (or CPI) is set on both the management information side and the object side (Packet Group) to perform copy management (copyright management) in two levels (management information and object) in preference to the object side (Packet Group). More specifically, a title menu uses the CCI of the ESOBI_GI, and an actual apparatus operation can execute processing in preference to the Packet Groups.

The structure of each stream object set ESOBS recorded in stream object group recording area 133 in FIG. 1 includes one or more ESOBs 141. Each ESOB corresponds to, e.g., one program of TV broadcasting. ESOB 141 includes one or more ESOBUs (Extended Stream object units) 143, each of which corresponds to object data for a given time interval (which changes depending on the value of an ESOBU_PB_TM_RNG (not shown)) or one or more GOP data. (Note that the ESOBU_PB_TM_RNG is included in time map information ESOB_TMAPI in ESOBI to be described later.)

When the transfer rate is low, one GOP data cannot often be sent within 1 s (1 second) (GOP data can be freely set in VR owing to internal encoding, but the next incoming data cannot be specified in the case of digital broadcasting since encoding is done by a broadcasting station). In this case, ESOBUs are delimited into 1 sec. time intervals, and 1 STREF_SZ=0 is set in the delimited ESOBU to indicate the absence of a reference picture. In this case, ESOBUs that cannot be used in random access are generated. For this reason, an ESOBU including the head of a randomly accessible picture is called an entry ESOBU (ESOBU_ENT) and is distinguished from that which does not allow any random access. Note that the information field of the 1 STREF_SZ is assured in an ESOBU_ENT (see FIG. 4) in a stream time map (STMAP) included in a stream file information table ESTR_FIT).

On the other hand, the transfer rate may be high, and I-picture data may be sent frequently. In such case, ESOBUs are delimited frequently, and ESOBU management information increases accordingly, thus ballooning the whole management information. For this reason, it is appropriate to delimit ESOBUs (other than the last ESOBU of an ESOB) by a given time interval (e.g., for each is: a delimitation unit=a picture unit) determined based on the total recording time or by one or more GOP data.

Note that different directories are prepared for respective formats, such as a VIDEO-TS directory for DVD video (ROM video) and a DVD-RTAV directory for DVD-RTR (recordable/reproducible DVD), and data of the HD_DVD-VR standard are recorded in a DVD_HDVR directory. That is, HR_MANGR.IFO is stored in the DVD_HDVR directory, and EVOB object files and TMAP files: HR_Vmmmm.MAP (mmmm includes the same numbers as those of VOB_INDEX: 1 to 1998) for respective EVOBs are stored in an HDVR_VOB directory under the DVD_HDVR directory. Also, ESOB object files, ESOB (AT_SOB) management files: HR_SFInn.SFI (when nn=00, type B; when nn=01 to 0xff, type A), and TMAP files: Snn_mmmm.SMP (when nn=00, type B, when nn=01 to 0xff, type A; mmmm includes the same numbers as those of EVOB (AT_SOB)_INDEX: 1 to 1998) for respective ESOBs are stored in an HDVR_SOB directory.

The structure of each ESOBS includes one or more ESOBs, each of which corresponds to, e.g., one program. One ESOB includes one or more ESOBUs (Extended Stream object units), each of which corresponds to object data for a given time interval (which changes depending on the value of the ESOBU_PB_TM_RNG) or one or more GOP data. When management information is formed on the PATS base in the case of a non-cognizable stream, AT_SOBUs are delimited at time intervals indicated by AT_SOBU_TM data. There are two types of AT_SOBU_TM data: it is designated in seconds or by a 27-MHz count value.

Figure 2:
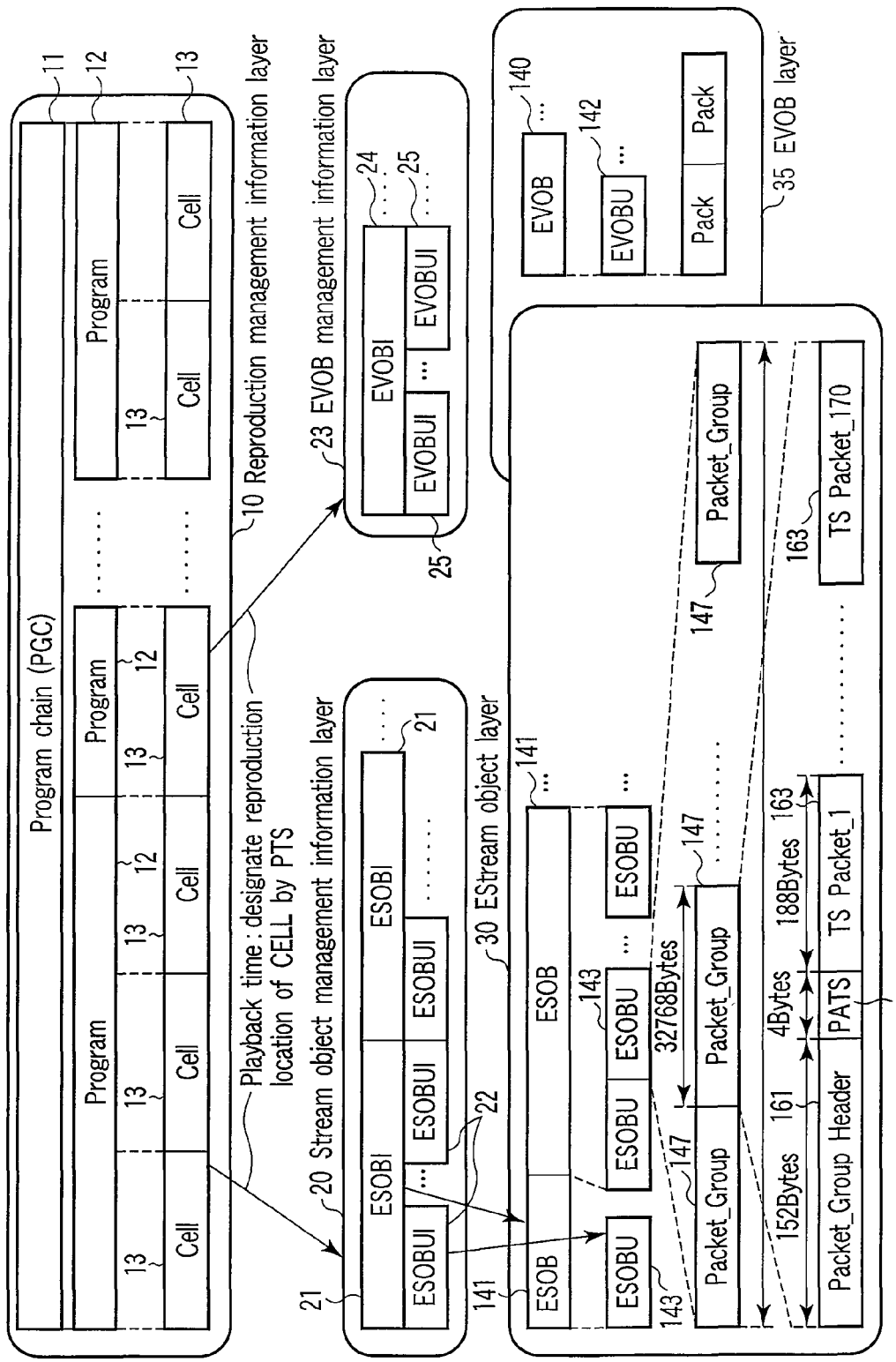
FIG. 2 is an exemplary view for explaining the relationship among a reproduction management information layer, object management information layer, and object layer in the data structure according to the embodiment.

FIG. 2 is a view for explaining the relationship among a reproduction management information layer, object management information layer, and object layer in the data structure according to the embodiment. As shown in FIG. 2, SR management data is recorded in a file common to VR, and undergoes control common to VR. SR and VR data are linked for respective cells, and the reproduction location is designated for each reproduction or playback time. This management data is called VR_MANGER.IFO.

In FIG. 2, one ESOBU includes one or more Packet Groups, each of which corresponds to 16 Logical Blocks (32768 bytes when 1 LB=2048 bytes). Each Packet Group includes a Packet Group Header and (170) TS packets. The arrival time of each TS packet is expressed by a PATS (Packet Arrival Time Stamp: 4 bytes) which is allocated before each TS packet.

The arrival times of TS packets need be linearly counted up until a video recording end time to have a video recording start time as 0 (or a predetermined value). Note that the STC and PATS may not always indicate the same value (due to different initial values or the like). However, the count interval of a PATS counter may be synchronized with that of an STC counter which corresponds to the interval between neighboring PCR fetch timings in a reproduction synchronized state. But a Packet Group can include a maximum of two ESOBs. That is, Packet Groups need not be aligned for respective ESOBs. Furthermore, the Packet Group Header is set with a Header_ID at the head of a Packet Group, and includes PKT_GRP_GI, CCI: Copy Control Information, and MNI (Manufacturer's information), which follows the Header_ID.

PGC information as playback information has the same format as a normal VR format, and ORG_PGC information is automatically generated by an apparatus upon video recording and is set in the order of video recording. UD_PGC information is generated according to a reproducing order which is freely added by the user, and is called a PLAYLIST. These two formats have a common format in PGC level. Note that PG information saves update date information of this PG. This information can identify when this PG was edited. Note that the PG number is an absolute number from the beginning of recording on this disc, and is an index number which remains unchanged even after other PGs are deleted.

Furthermore, in CELL information, types A and B are added to a CELL type, and this information designates an ESOBI_SRP number, start time, end time, and an ESI number of a default Video stream to be reproduced. The start and end times may be expressed by either the playback time (in the case of the PTM base) or PATS time (in the case of the PATS base).

When time is designated by a playback time: real time upon reproduction, the same access method as in conventional VR is allowed. In this case, since the user can designate a recording position using a playback time, a user's desire can be perfectly reflected. However, this method can be adopted only when the stream content can be sufficiently cognizable. If the content of the recorded stream are not sufficiently cognizable, a time can only be designated using a transfer time unit. If the recording position is designated using a playback time, reproduction cannot always be started from the head of I-picture data. If a frame at the playback start position is not that of I-picture, decoding starts from the immediately preceding I-picture, and display starts when the target frame is decoded. In this way, a picture can be presented to the user as if reproduction were started from the designated frame.

By assigning a unique ID number (PG_INDEX) to each PG, the PG data can be designated using numbers which remain unchanged even when middle PGs are deleted. The CELL is set with the ESTR_FI number and ESOBI_SRP number to be reproduced.

Figure 3:
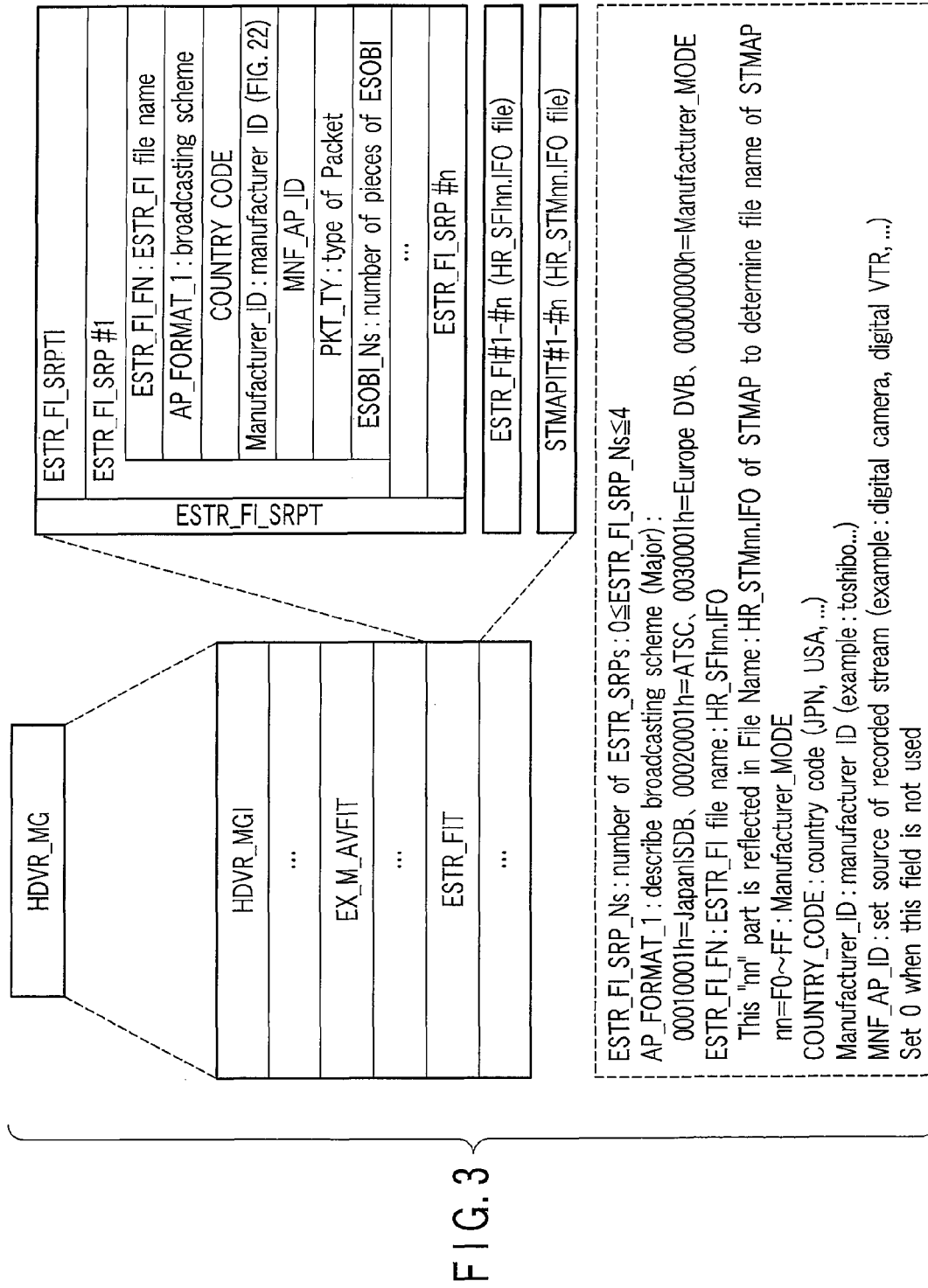
FIG. 3 is an exemplary view for explaining an example of the configuration of a field (ESTR_FIT) of management information recorded on AV data management information recording area 130.

FIG. 3 is a view showing an example of the configuration of a field (ESTR_FIT) of management information recorded in AV data management information recording area 130. In an HDVR directory, HR_MANGR.IFO as a DVD management information file, VRO files as analog video object files, and SRO files compatible to digital broadcasting are stored. A VMG file as management information is prepared by adding an ESTR_FIT (Extended Stream File Information table) to the management information of the conventional DVD-VR standard.

Management information of stream data is saved in the VMG, and is managed on the same level as VR data. Stream management information is saved in the ESTR_FIT (Extended Stream File Information Table). The ESTR_FIT includes a ESTR_FI_SPRT, a plurality of pieces of ESTR_FI, and STMAPIT. The ESTR_FI_SPRT includes ESTR_FITI (ESTR_FIT Information) and one or more ESTR_FI_SRPs.

The ESTR_FITI includes the total number of pieces of ESTR_FI, and the end address of this table. Each ESTR_FI_SRP includes the file name of ESTR_FI (ESTR_FI_FN: ESTR_FI_file_name), the edit update time of the ESTR_FI file (ESTR_FI_LAST_MOD_TM: not shown), AP_FORMAT_1 (broadcasting scheme: Major categories: Japan_ISDB, ATSC, EU_DVB, etc.), a country code of video recording (Country code: JPN=Japan), a packet type (PKT_TY: 1=MPEG-TS), the number of pieces of ESOBI (ESOBI_Ns: the number of pieces of ESOBI or the number of pieces of AT_SOBI), an ESTR_FI file size (not shown), the total size of an STMAP (not shown), and the like. In order to indicate that the stream is a stream of the manufacturer mode, a special code (e.g., 00000000h) is set in the AP_FORMAT_1. Furthermore, each RSTR_FI_SRP additionally includes an ID indicating the manufacturer of the apparatus (recorder), i.e., Manufacturer_ID (e.g., TOSHIBO; or TOSHIBO & MEC in the case of a joint ID of a manufacturer group in place of a single manufacturer), and an ID which can be freely set by each manufacturer, i.e., MNF_AP_ID (e.g., a character indicating the location of a source such as a digital camera recorder, digital VCR, and the like), and so forth. In this way, the format of ESTR_FI can be determined without opening it (independent file), and whether or not that format is supported by the recorder can be checked.

Note that the PGC described with reference to FIG. 2 includes an original ORG_PGC which is created upon original video recording, and a user-defined UD_PGC created by a user's edit operation and the like later. Either PGC is managed by program chain information PGCI (management information indicating the whole reproducing processing of the PGC). ORG_PGCI as original PGC information and a UD_PGCIT as table information of a set of one or more pieces of user-defined PGC information are stored in the HDVR_MG shown in FIG. 3 although not shown.

Although not shown, the PCGI includes PGC general information (PGC_GI), one or more pieces of program information (PGI#1 to PGI#m), one or more cell information search pointers (CI_SRP#1 to CI_SRP#n), and pieces of cell information (CI#1 to CI#n) as many as the number of these search pointers. (A cell is a data structure indicating a part of a program, and corresponds to a reproduction unit of that program.) There are three types of cell information CI: movie cell information (M_CI), stream cell information of type A (STRA_CI), and stream cell information of type B (STRB_CI). The M_CI is information used to manage reproduction of an MPEG-PS video object (EVOB). The STRA_CI is information used to manage reproduction of an MPEG-TS stream object (ESOB of type A) whose contents are cognizable. The STRB_CI is information used to manage reproduction of an MPEG-TS stream object (ESOB of type B) whose contents are non-cognizable.

Of these pieces of information, the embodiment mainly relates to the STRA_CI. This STRA_CI includes type information (C_TY) indicating that a cell of interest is a stream cell of type A, a stream file information number (ESTR_FIN)

corresponding to the cell of interest, a stream object information search pointer number (ESOBI_SRPN) corresponding to a stream object (ESOB) to which the cell of interest belongs, the number (C_EPI_Ns) of pieces of entry point information in the cell of interest, the start time (C_S_PTM) of the cell of interest, the end time (C_E_PTM) of the cell of interest, a default video ESOB elementary stream information number (C_DEF_V_ESOB_ESIN) that describes a default reproducing video elementary stream number for a corresponding cell, and the like. Note that one ESI set in ST1211 of FIG. 17 to be described later can be specified as a default by the C_DEF_V_ESOB_ESIN.

Figure 4:
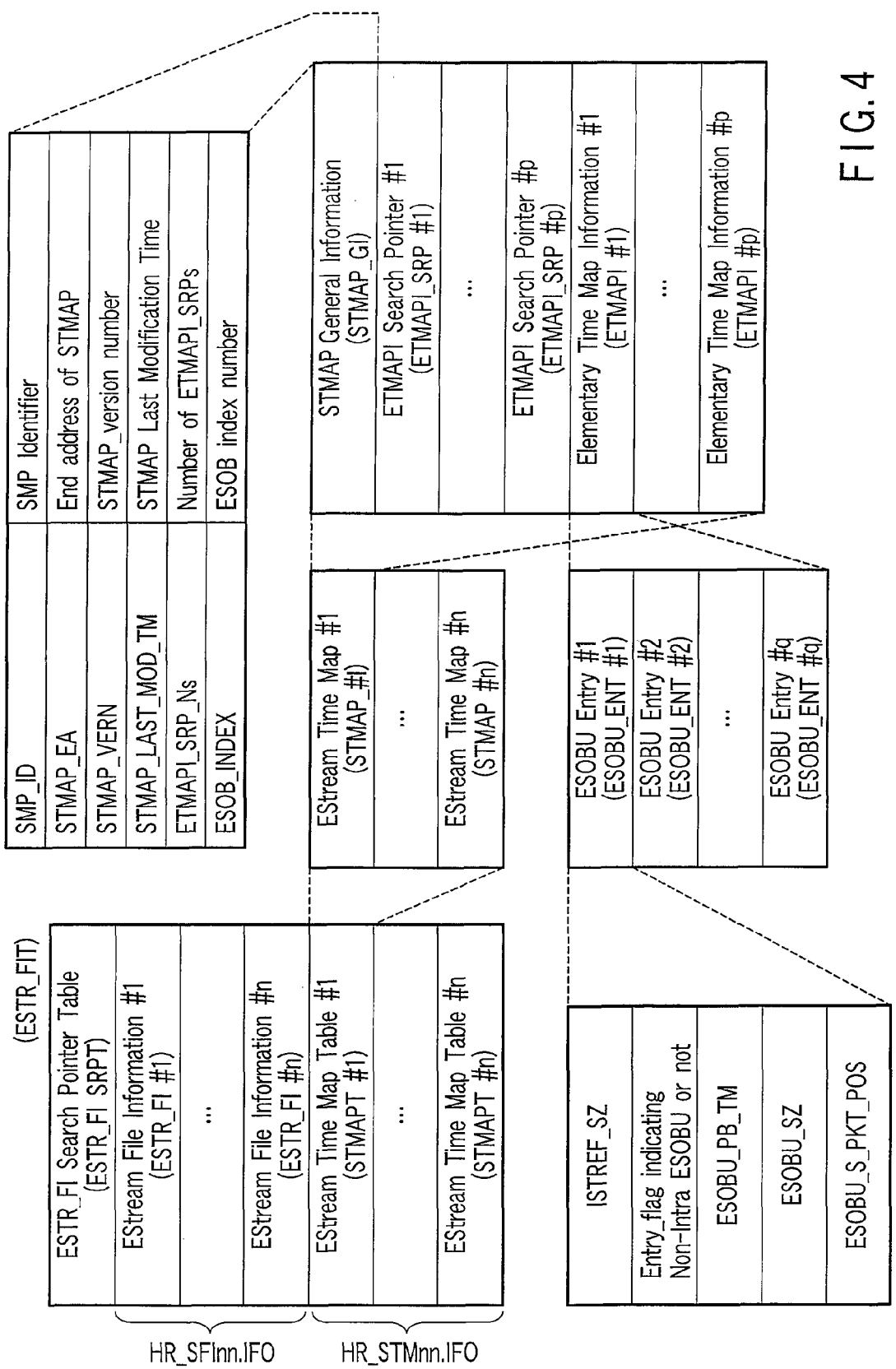
FIG. 4 is an exemplary view for explaining an example of the configuration of another field (STMAPT) of management information recorded on AV data management information recording area 130.

FIG. 4 is a view showing an example of the configuration of another field (STMAPT) of management information recorded in AV data management information recording area 130. The ESTR_FIT includes ESTR_FI search pointer table ESTR_FI_SPRT, one or more pieces of stream file information ESTR_FI#1 to ESTR_FI#n, and one or more stream time map tables STMAPT#1 to STMAPT#n. Each STMAPT is configured to include one or more stream time maps STMAP#1 to STMAP#n. Each STMAP is configured to include stream time map general information STMAP_GI, one or more elementary time map information search pointers ETMAPI_SRP#1 to ETMAPI_SRP#n, and one or more pieces of elementary time map information ETMAPI#1 to ETMAPI#n. Each ETMAPI is configured to include one or more stream object unit entries ESOBU_ENT#1 to ESOBU_ENT#n.

The STMAP_GI is configured to include an identifier (SMP_ID) of a corresponding stream time map, the end address (STMAP_EA) of that time map, the version (STMAP_VERN) of that time map, the latest update time (STMAP_LAST_MOD_TM) of that time map, the number (ETMAPI_SRP_Ns) of ETMAPI search pointers, an index number (ESOB_INDEX) of a corresponding stream object, and the like.

Each ESOBU_ENT is configured to include 1STREF_SZ that describes the size of the first reference picture (I-picture in the case of MPEG-TS) of the ESOBU of interest, ESOBU_PB_TM that describes the playback time of the ESOBU of interest, ESOBU_SZ that describes the size of the ESOBU of interest, ESOBU_S_PKT_POS that describes the start packet position of the ESOBU of interest, and the like. This ESOBU_ENT can include a flag (Entry_flag) indicating whether or not a corresponding stream object unit (data unit, access unit, or decode unit) is a Non-Intra ESOBU, which will be described later.

Figure 5:
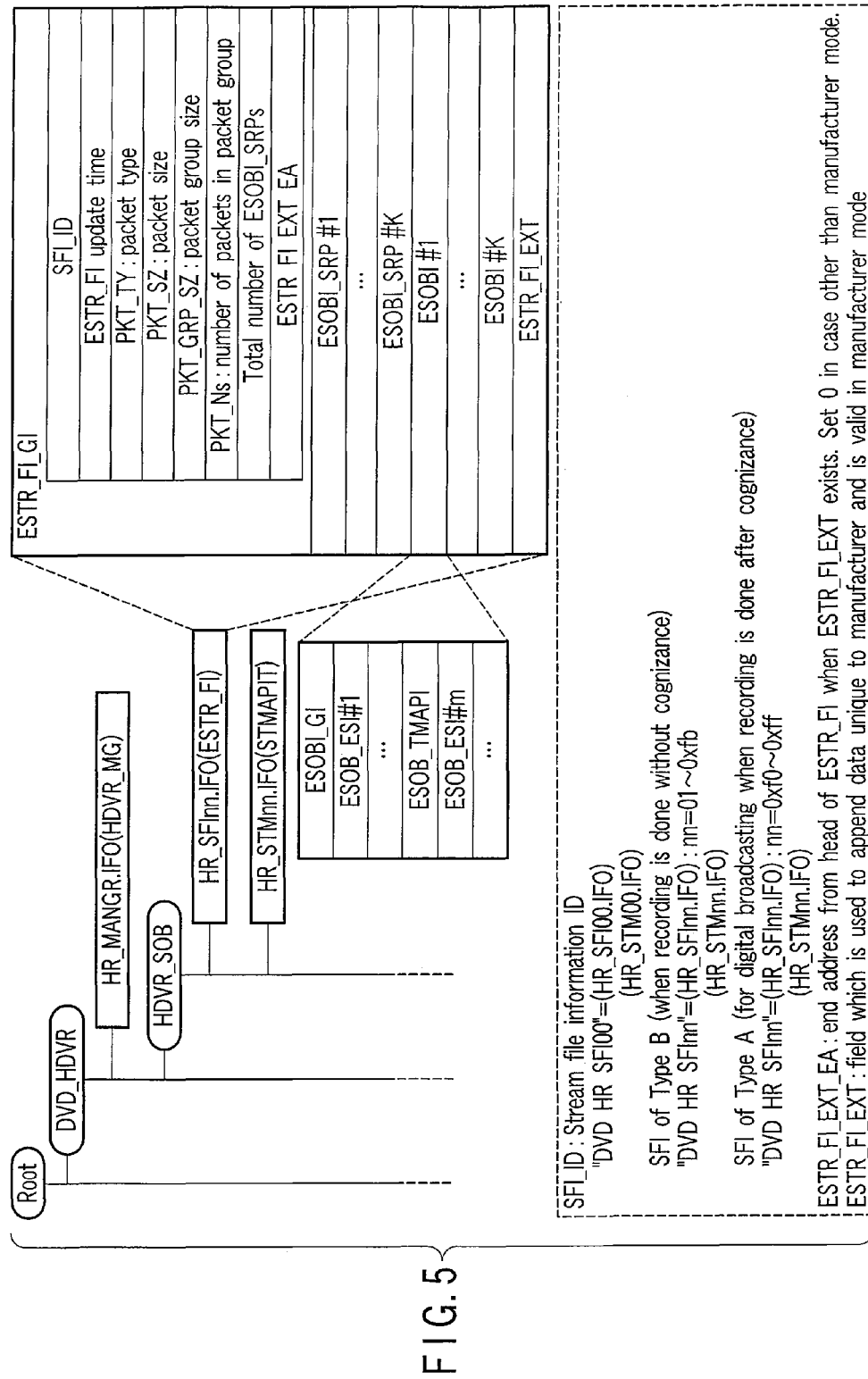
FIG. 5 is an exemplary view for explaining an example of the configuration of a part of a file structure of management information and management information (ESTR_FI) corresponding to a management information file (HR_SFInn.IFO) in that file structure.

FIG. 5 is a view for explaining an example of the configuration of a part of a file structure of management information and management information (ESTR_FI) corresponding to a management information file (HR_SFInn.IFO) in that file structure. The ESTR_FI is configured to include ESTR_FI_GI (General Information), one or more ESOBI_SRPs (Stream Object Information Search Pointers), pieces of ESOBI (ESOB Information) which are as many as the ESOBI_SRP#ks and are indicated by their values, and ESTR_FI_EXT which is a field used to append data unique to a manufacturer (manufacturer unique information) to the ESTR_FI and is valid in the case of the Manufacturer_Mode, and the like.

The ESTR_FI_GI is configured to additionally include the file name/file number (SFI_ID) of an object managed by the ESTR_FI of interest, the number of ESOBI_SRPs in the ESTR_FI of interest, the Version number of the file of interest, PKT_TY (1=MPEG-TS), PKT_GP_SZ (a packet group size: fixed to 16 Logical Blocks), PKT_Ns (the number of TS packets in a packet group: 0xAA: fixed to 170 TS packets), the STMAP update time, an STMAP size, and the like. Furthermore, the management information is added with the ESTR_FI_EXT as needed to save data there, and the end address of the ESTR_FI_EXT from the head of the ESTR_FI is set in an ESTR_FI_EXT_EA. If no ESTR_FI_EXT is used, 00000000h is set in the ESTR_FI_EXT_EA.

Note that M_VOBI describes update date and time information (VTMAP_LAST_MOD_TM: not shown) of each VTMAPT as a TMAP (Time Map) for Video Recording (VR) that records and reproduces analog sources by a self apparatus. Also, the STMAP_GI in FIG. 4 describes update date and time information (STMAP_FI_LAST_MOD_TM) of each STMAPT as a TMAP (Time Map) for Stream Recording (SR) that records and reproduces digital broadcasting. The values of these pieces of update date and time information are compared to update date and time information (ESTR_FI update time in FIG. 5) described in each TMAPT file, and if they are equal to each other, it is determined that consistency is assured, thus executing processing.

Figure 6:
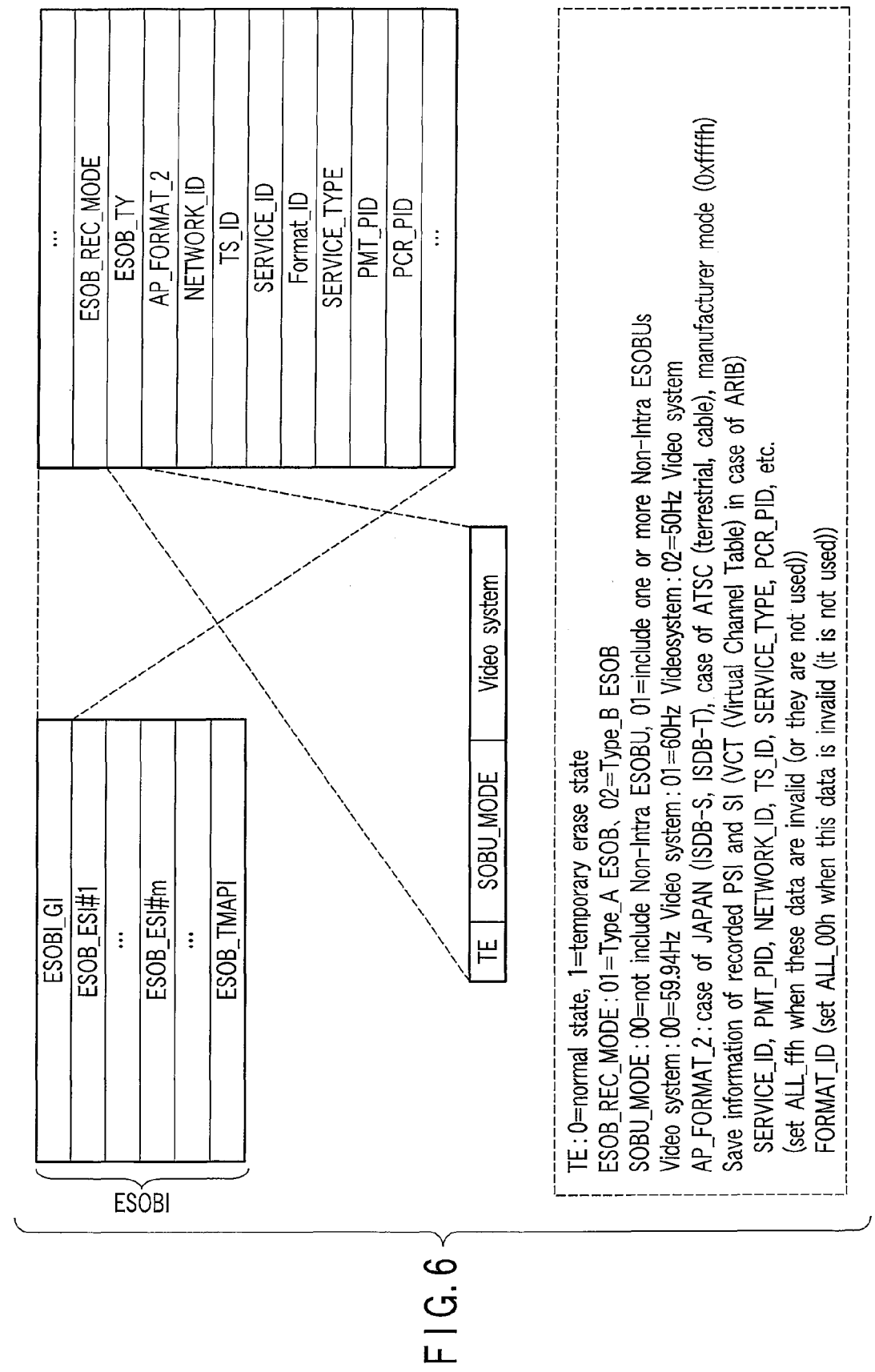
FIG. 6 is an exemplary for explaining an example of the configuration of a field (ESOBI_GI) of management information.

FIG. 6 is a view for explaining an example of the configuration of a field (ESOBI_GI) of management information ESOBI. The ESOBI (Extended Stream Object Information) is configured to include ESOBI_GI (General Information), ESOB_ESI (Elementary Stream Information), ESOB_DCNI (Discontinuity Information), ESOB_CONNI (Connect Information), and ESOB_TMAP (Time Map).

The ESOBI_GI describes ESOB_REC_MODE, ESOB_TY, AP_FORMAT_2 (Minor: 1=ISDB-S: BS/CS broadcasting, 2=ISDB-T: terrestrial digital broadcasting, 0xff: other (which is set in a stream according to the embodiment)), video recording start date and time (EVOS_REC_TM), video recording time period (ESOB_DURATION (not shown): ALL 0xff if no valid value is available), start time (ESOB_S_PTM/S_PATS (not shown)), end time (ESOB_E_PTM/E_PATS (not shown)), and the like. The ESOB_TY describes a Temporary Erase (TE) flag indicating whether or not a temporary erase state is set, SOBU_MODE indicating whether or not a Non-Intra ESOBU is included, information of the adapted Video System, and the like.

The SOBU_MODE is set to be, e.g., 00 when an ESOBU cluster (to be described later with reference to FIG. 10) does not include any Non-Intra ESOBU, and 01 when the cluster includes one or more Non-Intra ESOBUs.

The ESOBI_GI can further describe SERVICE_ID, PTM_PID, NETWORK_ID, TS_ID, FORMAT_ID, SERVICE_TYPE, PCR_PID, and the like based on PSI and SI values. In the case of broadcast video recording of ARIB, the ESOBI_GI saves a Virtual Channel Table (VCT) as information of PSI and SI.

Furthermore, the ESOBI_GI is configured to additionally include ESOB_ES_Ns (the number of ESs selected for video recording), ESOB_V_ES_Ns (the number of ESs for which TMAP data are generated of recorded video ESs), ESOB_A_ES_Ns (the number of ESs for which TMAP data are generated of recorded audio ESs), ESOB_ID (a serial number unique to an ESOB), Manufacturer_DATA (a field that each manufacturer can freely set), and the like, although not shown. However, type B and a stream according to the embodiment may be recorded without being cognized. In such case, since it is determined that the PSI and SI values are unknown (or unreliable), the SERVICE_ID, PTM_PID, NETWORK_ID, TS_ID, FORMAT_ID, SERVICE_TYPE, PCR_PID, and the like cannot be described. In such case, a flag indicating the invalidity of information of PSI and SI can be set in a bit (b12) of the ESOB_TY. If that flag is set, the values of the SERVICE_ID, PTM_PID, NETWORK_ID, TS_ID, FORMAT_ID, SERVICE_TYPE, and PCR_PID are invalid. Alternatively, in place of the whole flag, an invalid value (0xff) may be set for each of the values of the SERVICE_ID, PTM_PID, NETWORK_ID, TS_ID, FORMAT_ID, SERVICE_TYPE, and PCR_PID, and that value is set if they are invalid Note, however, that the PSI and SI values may often be valid even in type B.

The ESOB_REC_MODE (FIG. 6) indicates the type of stream: 01=TYPE_A_ESOB, and 02=TYPE_A_ESOB. Type A is a stream whose stream structure is cognizable, and whose management information is managed on the playback time (PTM) base. On the other hand, Type B is a stream whose stream structure is not cognizable and, hence, whose management information is managed on the packet arrival time (PATS) base. For this reason, Type A adopts a TMAP on the PTM base, and Type B adopts a TMAP on the PATS base.

The ESOB_ESI describes ESOB_ES_PID (the PID of an ES), STREAM_TYPE (STREAM type indicated in the PMT), ES_Index (the value of COMPONENT_TAG indicated by the component descriptor, or a value uniquely and appropriately assigned by this apparatus), and the like. In the case of a Video stream, the ESOB_ESI describes a Video compression mode (the type of compression mode: 1=MPEG-1, 2=MPEG-2, 3=MPEG-4_AVC, 4=VC-1, ...), Aspect Ratio (0=4:3, 1=16:9), Source resolution (0=352*240 (288), 1=352*480 (576), 2=480*480 (576), 3=544*480 (576), 4=704*480 (576), 5=720*480 (576), 8=1280*720, 9=960*1080, 10=1280*1080, 11=1440*1080, 12=1920*1080, 16=640*480 (576), 17=unspecified (Horizontal)*240 (288) (Vertical), 18=unspecified (Horizontal)*480 (576) (Vertical), 19=unspecified (Horizontal)*720 (Vertical), 20=unspecified (Horizontal)*1080 (Vertical), 1 fh=unspecified), Source picture progress mode (0=Interlaced, 1=Progressive, 3=unspecified), frame rate (1=24/1.001, 2=24, 3=25, 4=30/1.001, 5=30, 6=50, 7=60/1.001, 80=60, 0xf=unspecified), and the like.

Note that "unspecified" is set as a description if the content of an object cannot be examined when it is not determined based only on the cognition of PSI and SI. In ARIB, especially, since the vertical resolution alone is specified but the horizontal resolution is unspecified, only the vertical resolution can be described.

In the case of an Audio stream, the ESOB_ESI includes an audio coding mode (0=AC3, 2=MPEG-1 or MPEG-2 without extension bitstream, 3=MPEG-2 with extension bitstream, 4=L-PCM, 0x30 =MPEG-2 AAC, 0x3f=unspecified), sampling frequency (0=48 kHz, 1=96 kHz, 2=192 kHz, 4=12 kHz, 5=24 kHz, 8=32 kHz, 9=44.1 kHz, 0xf=Unspecified), the number of audio channels (0=1 ch (Mono), 1=2 ch (Stereo), 2=3 ch, 3=4 ch, 4=5 ch, 5=6 ch, 6=7 ch, 7=8 ch, 9=2 ch (Dual Mono), 0xf=unspecified), and the like.

The ESOB_TMAP includes ESOB_TMAP_GI and one or more pieces of ES_TMAP_GI (not shown). The ESOB_TMAP_GI includes ADR_OFS (a Packet Group number (or logical block (LB) address) from the head of a file to the head of an ESOB), and also includes the following pieces of information. That is, in the case of the PTM base, the ESOB_TMAP_GI is configured to include ESOB_S_PKT_POS (the start position of an ESOB in a first Packet Group: 0≦ESOB_S_PKT_POS≦169), ESOB_E_PKT_POS (the end position of an ESOB in a first Packet Group: 0≦ESOB_E_PKT_POS<169), ESOB_SZ (ESOB size), and ES_TMAP_GI_Ns (the number of ES_TMAPs that belong to the ESOB of interest).

Each ES_TMAPI_GI includes ESIN (the ESI number of a target ES of the TMAP of interest), ADR_OFS (logical addresses from the head of an ESOB file to the head of the ES of interest), ES_S_PTM (ES start time: start PTM), ES_E_PTM (ES end time: end PTM), ES_ESOBU_ENT_Ns (the number of ESOBU_ENTs), LAST_ESOBU_E_PKT_POS (position of the last ESOBU in a packet group), and STMAP_N (the TMAP number in the STMAPIT, which belongs to the ES of interest: this number may be omitted when TMAPs are recorded in turn in each STMAPT).

The STMAPIT (FIG. 3) is recorded in an independent field (file), and comprises STMAPITI, one or more pieces of STMAPI_GI, one or more ETMAPI_SRPs, and a plurality of pieces of ETMAPI as many as the number of ETMAPI_SRPs. The STMAPTI (corresponding to STMAP#1 to STMAP#n in FIG. 4) includes the end address information of the STMAPT, the version information of this TMAP, STMAP_SRP_Ns (the number of pieces of TMAP_SRPI=the number of pieces of TMAPI), the update date information of the STMAP (which is the same as the value of the VMGI), and the number of pieces of STMAPI_GI. Each of the STMAP#1 to STMAP#n in FIG. 4 includes STMAP general information (STMAP_GI). The STMAP_GI includes the number of ETMAPI search pointers belonging thereto. The ETMAPs belonging to the STMAP are determined in the number sequence from the first one. The ETMAP_SRP includes address information to ETMAPI, and the number of ESOBU_ENTs. Here, garbage data (or meaningless data) may exist among ESOBU_ENTs.

In the case of the PATS base (type B), the ESOB_TMAP_GI includes ADR_OFS (a Packet Group number (or logical block (LB) address) from the head of a file to the head of an ESOB), AT_SOBU_TM (arrival time interval of ESOBUs: 0=1 s, 1=2 s), ESOB_S_PKT_POS (the start position of an ESOB in a first Packet Group: 0≦ESOB_S_PKT_POS≦169), ESOB_E_PKT_POS (the end position of an ESOB in a first Packet Group: 0≦ESOB_E_PKT_POS≦169), AT_SOBUI_Ns (the number of pieces of AT_SOBUI which belong to the ESOB of interest) or AT_SOBU ENT_Ns (the number of AT_SOBU entries in the STMAPI of the ESOB of interest), ESOB_SZ (ESOB size), and the like. The edit processing is done for respective AT_SOBUs, and the adjustment processing is done based on PATS start time and PATS end time (CELLI).

When ESTR_FI (FIG. 5) as management information for digital broadcasting is changed for each broadcasting station (or each broadcasting scheme), a plurality of pieces of ESTR_FI exist. Hence, ESTR_FI_SRPT information (FIG. 3) exists to designate an ESTR_FI file to be used, and its structure includes ESTR_FI_SRPTI and an ESTR_FI_SRP as pointer information to each ESTR_FI. Note that each ESTR_FI_SRP (FIG. 3) includes the file name of ESTR_FI (ESTR_FI_FN), the update date and time information of the ESTR_FI file (ESTR_FI_LAST_MOD_TM), an ESTR_FI file size (ESTR_FI_SZ), AP_FORMAT1 and Country code as broadcasting scheme information, a Packet Type, the number of pieces of ESOBI (ESOBI_Ns), the ESTR_FI size, the STMAP size which belongs to the ESTR_FI of interest, and the like. Note that the update date and time information is also set in the ESTR_FI file. When ESTR_FI is changed upon editing, that value is updated. Upon reproduction, the updated value is compared with the value in the ESTR_FI file. If the two values are the same, reproduction is permitted. The number of pieces of ESTR_FI is four or less, and the number of pieces of ESOBI is 999 or less. A part "nn" of ESTR_FI file name: HR_SFInn.IFO is reflected on that of File Name: HR_STMnn.IFO of the STMAP, thus determining the file name of the STMAP.

However, as contents of TS streams, Digital Handycam, various kinds of cable broadcasting, Internet broadcasting, and the like are known in addition to digital broadcasting. The standard of each individual stream can be cognized upon recording, but such standard is not registered in the HD_DVD-VR standard. Although an STC-based TMAP data can be generated, some pieces of information such as ESTR_FI, ESOBI, and the like may not be generated.

To solve this problem, a mode that can generate ESTR_FI, ESOBI, and the like in a format unique to each manufacturer is added to the HD_DVD-VR standard. As characteristic features of these streams, PTS-based TMAP data can be generated since they are cognizable streams, but these streams may not include parameters such as component_tag, NETWORK_ID, SERVICE_TYPE, and the like, which are indispensably included in broadcasting in Japan. In this case, the values of parameter fields which are not used are padded with 0xff.

Figure 7:
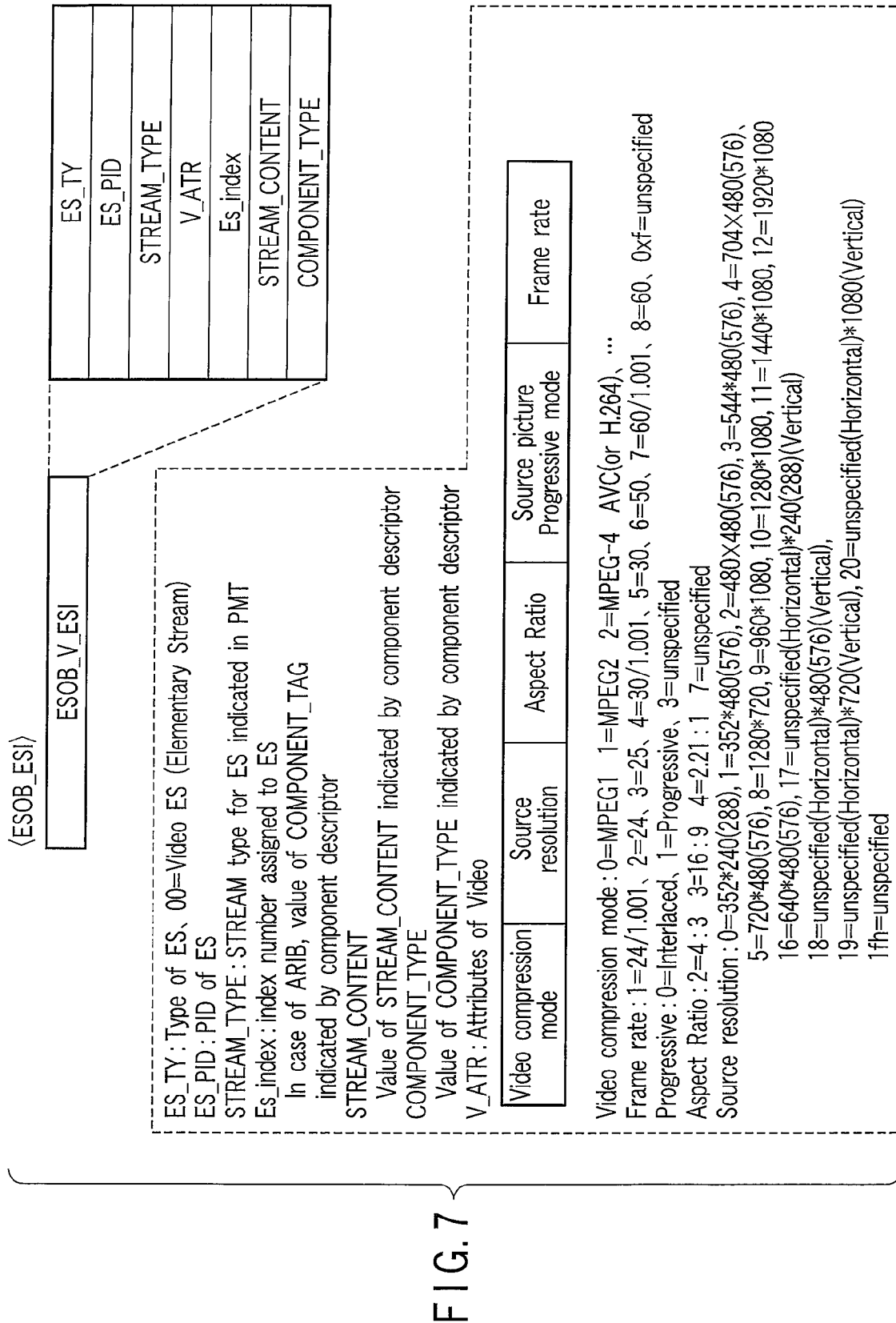
FIG. 7 is an exemplary view for explaining an example of the configuration of another field (ESOB_V_ESI) management information and an example of the configuration of a video attribute (V_ATR) included in this ESOB_V_ESI.

The ESOB_ESI in FIG. 6 is classified into three types (ESOB_V_ESI in FIG. 7, and ESOB_A_ESI and ESOB_OTHER_ESI (not shown)). ESOB_ES_PID (the PID of an ES), STREAM_TYPE (STREAM type indicated in the PMT), STREAM_CONTENT (STREAM_CONTENT value indicated by the component descriptor), COMPONENT_TYPE (the value of COMPONENT_TYPE indicated by the component descriptor), and ES_Index (example: in case of ARIB, the value of COMPONENT_TAG indicated by the component descriptor, i.e., an index number uniquely assigned to an ES in the ESOB of interest) are common to these three different types of ESOB_ESI. Furthermore, V_ATR is added to ESOB_V_ESI.

FIG. 7 is an exemplary view for explaining an example of the configuration of the ESOB_V_ESI, and an example of the configuration of a video attribute (V_ATR) included in this ESOB_V_ESI. In FIG. 7, a video compression mode is information indicating MPEG-1, MPEG-2, MPEG-4 AVC (H.264), VC-1 of SMPTE, or the like as the video encoding format. A source picture resolution is information indicating the video resolution in the horizontal direction and/or that in the vertical direction. An Aspect ratio is information indicating 4:3, 16:9, or the like as the video aspect ratio. A Source picture Progressive mode is information indicating interlaced/progressive (I/P). A Frame rate is information indicating the number of frames or the like to be output per second.

More specifically, the V_ATR describes the Video compression mode (the type of compression mode: 0=MPEG1, 1=MPEG2, 2=MPEG4_AVC (or H.264), 3=VC-1 Compressed Video Bitstream Format and Decoding Process of SMPTE Standard, . . . ), Aspect Ratio (0=4:3, 1=16:9), Source resolution (the practical example has already been described above), Source picture progress mode (0=Interlace, 1=Progressive, 3=unspecified), frame rate (1=24/1.001, 2=24, 3=25, 4=30/1.001, 5=30, 6=50, 7=60/1.001, 80=60, 0xf=unspecified), and the like.

Note that "unspecified" is set to describe it if the contents of an object cannot be examined when it is not determined based only on the cognition of PSI and SI. In ARIB, especially, since the vertical resolution alone is specified but the horizontal resolution is unspecified by cognizing only the descriptor, only the vertical resolution can be described.

Figure 8:
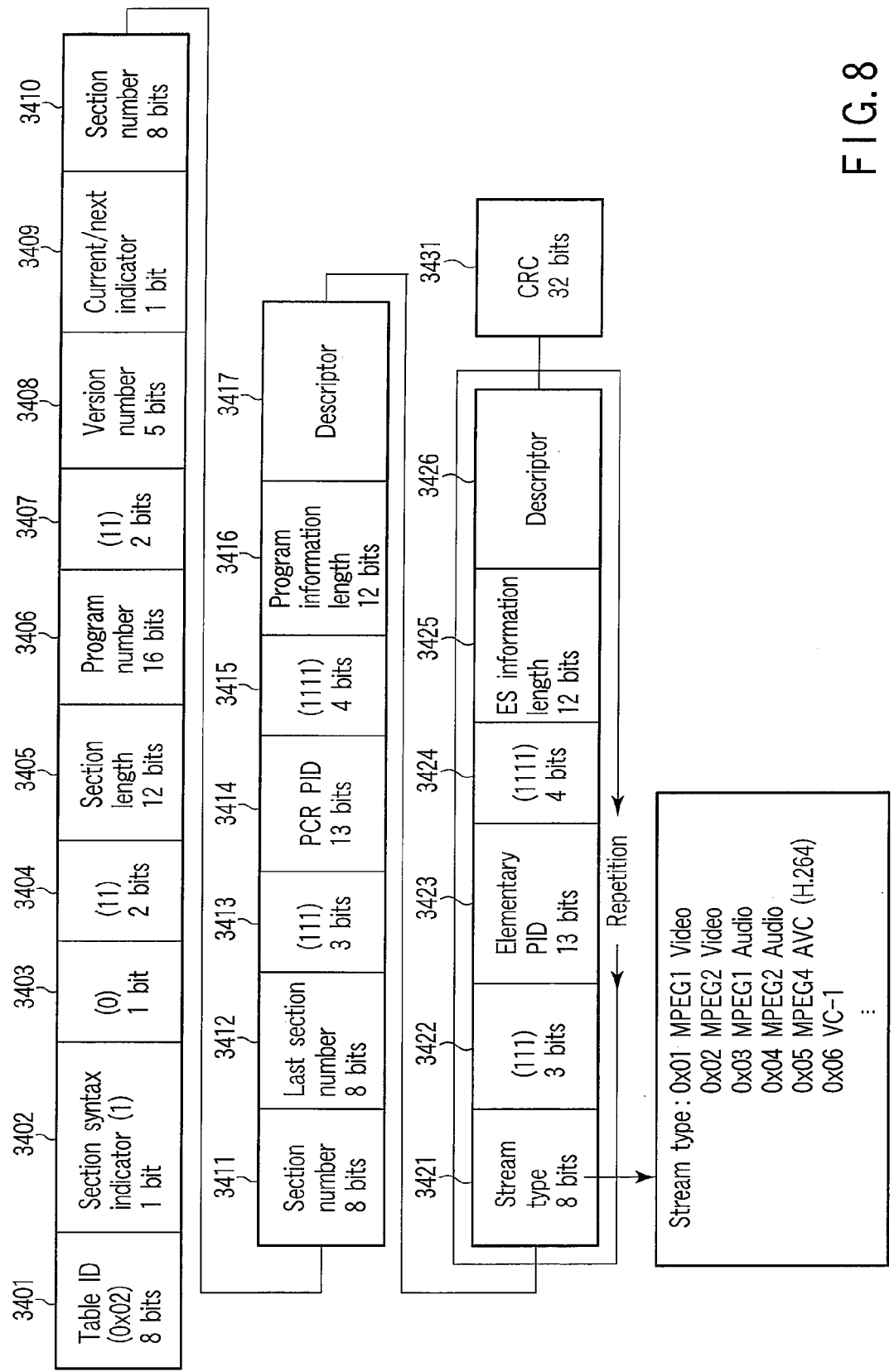
FIG. 8 is an exemplary view for explaining an example of the data structure of a program map table (PMT)

FIG. 8 is an exemplary view for explaining an example of the data structure of program map table PMT. In this PMT, various streams can be identified by an 8-bit stream type. For example, a stream type="0x01" indicates a stream of MPEG-1 Video. A stream type="0x02" indicates a stream of MPEG-2 Video (including Hi-Vision). A stream type="0x03" indicates a stream of MPEG-1 Audio. A stream type="0x04" indicates a stream of MPEG-2 Audio (including AAC multi-channel audio). Furthermore, a stream type="0x05" indicates a stream of MPEG-4 AVC (or H.264). A stream type="0x06" indicates a stream of VC-1.

Figure 9:
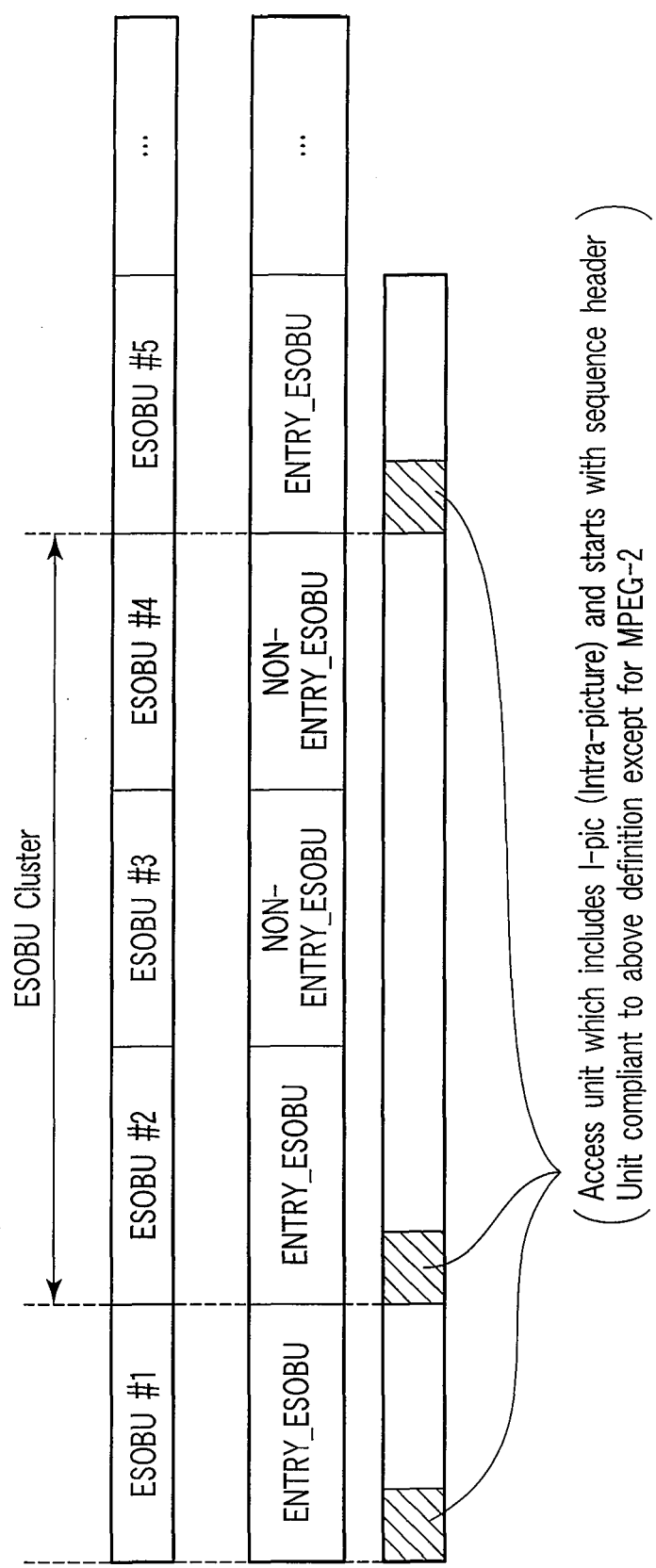
FIG. 9 is an exemplary view for explaining a case in which a set (ESOBU cluster) of data units of a recording object (ESOB) does not include any Non-Intra ESOBU.

FIG. 9 exemplifies a case in which a set of data units (ESOBU cluster) of a recording object (ESOB) does not include any Non-Intra ESOBUs. The ESOBU cluster means a group of an entry ESOBU and one or more non-entry ESOBUs that follow the entry ESOBU (until the next entry ESOBU or next Non-Intra ESOBU appears). The ESOBU cluster is used, e.g., when a Video Access Point is not found for a long period of time. The ESOBU cluster can be handled in the same manner as one ESOBU except for a case in which information in the ESOBU_ENT of a time map is to be processed.

Note that the 1 STREF_SZ (1 st_Ref_PIC_SZ in FIG. 12) and ENTRY_flag of the ESOBU cluster are the same as those of the entry ESOBU of the ESOBU cluster. The 1 STREF_SZ and ENTRY_flag values of all the non-entry ESOBUs assume zero.

The ESOBU size of the ESOBU cluster amounts to a total of the ESOBU_SZ values (FIG. 12) of all ESOBUs which belongs to that cluster. In this case, the size of each ESOBU in the cluster carries no special significance, and the total size is significant.

The ESOBU_S_PKT_POS of the ESOBU cluster is the same as that (FIG. 12) of the entry ESOBU of that cluster. The ESOBU_S_PKT_POS values of all the non-entry ESOBUs assume zero.

The ESOBU_PB_TM of the ESOBU cluster amounts to a total of the ESOBU_PB_TM values (FIG. 12) of all the ESOBUs which belong to that cluster. In this case, the playback time of each ESOBU in the cluster carries no special significance, and the total playback time is significant. Note that the ESOBU_PB_TM values of all ESOBUs which belong to the ESOBU cluster are prevented from becoming zero.

In the example of FIG. 9, the ESOBU cluster is configured by the Entry ESOBU and Non-Entry ESOBUs. The Entry ESOBU starts with a Video Access Packet (not shown), and the payload of this Video Access Packet starts with a Video Access Point of a target video stream.

The default definition of the Video Access Point is as follows. That is, in the case of MPEG-1 or MPEG-2 video, the first byte of a PES packet including an access unit that starts with a sequence header and corresponds to an I-picture is a default Video Access Point (note that the access unit is defined in the MPEG-2 system). In the case of MPEG-4 AVC as a typical example of the high-efficiency encoding scheme adopted by the HDDVD, the first byte of a PES packet including an AVC access unit that starts with an access unit delimiter and a sequence parameter set and corresponds to an I-picture is a default Video Access Point (note that the AVC access unit is defined in the MPEG-2 system). In the case of VC-1 which is adopted by the HDDVD and is one of the high-efficiency encoding schemes, the first byte of a PES packet including an access unit that starts with a Sequence Header and Sequence Start Code followed by an Entry Point Start Code and Entry Point Header and corresponds to an I-picture is a default Video Access Point (the access unit in this case is defined by SMPTE RP227).

Note that first reference picture size (1 STREF_SZ or 1 st_Ref_PIC_SZ) in the ESOBU entry (corresponding to ESOBU_ENT in FIG. 12) and/or the entry flag (ENTRY_flag) assume or assumes a non-zero value. The value of the ENTRY_flag of the Entry ESOBU does not assume FFh. The ESOBU playback time specified by the ESOBU_PB_TM (FIG. 12) assumes a value which is longer than zero and is equal to or shorter than 2.002 sec.

The Non-Entry ESOBU in FIG. 9 is an access unit which includes a reference picture (I-picture in MPEG-2) at its head position and starts with a sequence header. Other than MPEG-2, a similar access unit which includes a reference picture at its head position becomes a Non-Entry ESOBU.

Note that the Non-Entry ESOBU starts with neither a Video Access Packet nor a Non-Intra Video Access Packet of a target video stream. In the Non-Entry ESOBU, the 1 STREF_SZ (1 st_Ref_PIC_SZ) and ENTRY_flag values in the ESOBU_ENT assume zero. In the Non-Entry ESOBU, the ESOBU playback time specified by the ESOBU_PB_TM is equal to or shorter than 2.002 sec, but it does not assume zero.

Figure 10:
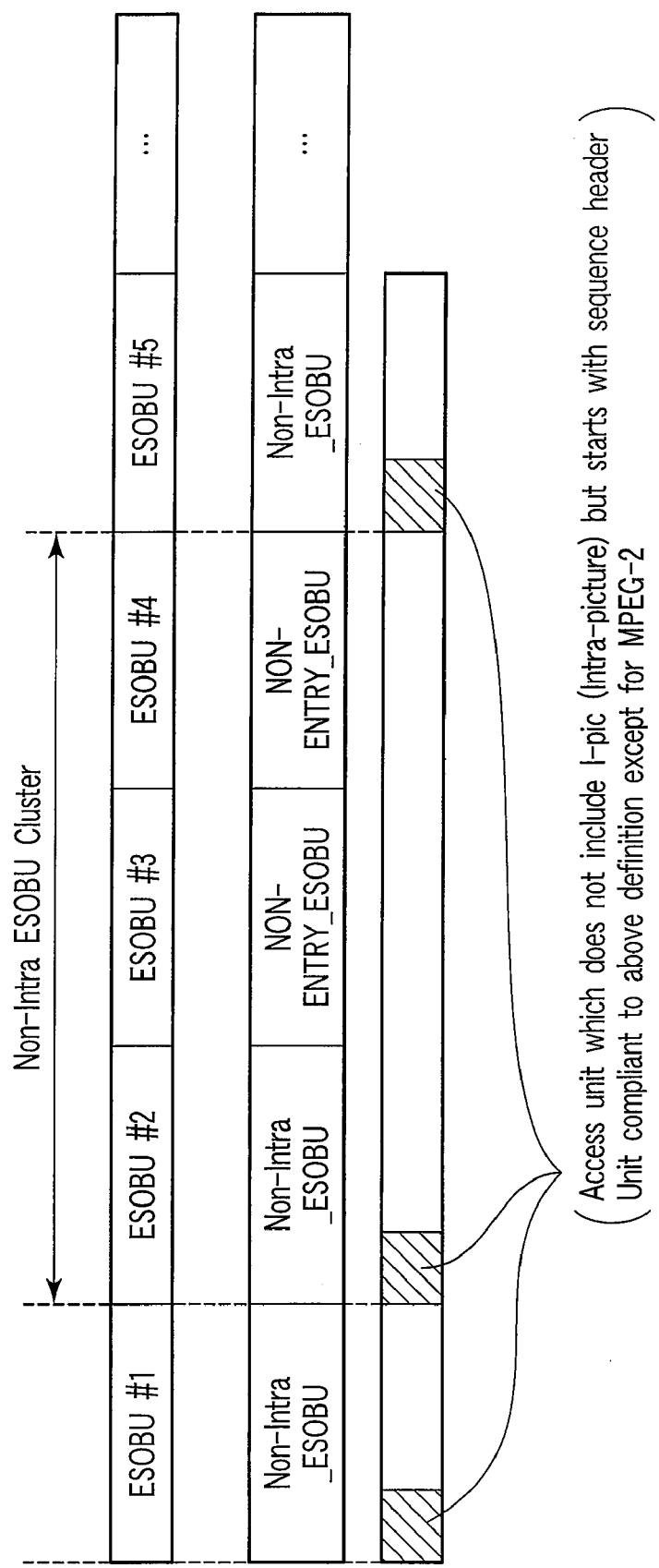
FIG. 10 is an exemplary view for explaining a case in which a set (Non-Intra ESOBU cluster) of data units of a recording object (ESOB) includes Non-Intra ESOBUs.

FIG. 10 exemplifies a case in which a set (Non-Intra ESOBU cluster) of data units of a recording object (ESOB) includes Non-Intra ESOBUs. Depending on application formats (digital broadcasting schemes), an I-picture does not exist for a long period of time, or a video stream does not include any I-picture at all in some cases. The Non-Intra ESOBUs and Non-Intra ESOBU cluster are defined in consideration of such situation. The SOBU_MODE shown in FIG. 6 is defined as navigation data indicating the probability of Non-Intra ESOBUs.

In an apparatus (an HDDVD recorder, HDDVD player, or personal computer installed with HDDVD compatible software) that supports a case in which an I-picture does not exist for a long period of time, or a video stream does not include any I-picture, the performance of special reproducing processing (not shown) such as skip and the like can be enhanced by accessing the start part of the Non-Intra ESOBU.

The Non-Intra ESOBU cluster means a group of a Non-Intra ESOBU and one or more non-entry ESOBUs that follow the Non-Intra ESOBU (until the next entry ESOBU or the next Non-Intra ESOBU appears or to a position before the end of an ESOB). The Non-Intra ESOBU cluster is used, e.g., when a Video Access Point or Non-Intra Video Access Point is not found for a long period of time. The Non-Intra ESOBU cluster can be handled in the same manner as one Non-Intra ESOBU except for a case in which information in the ESOBU_ENT of a time map is to be processed.

The 1 STREF_SZ and ENTRY_flag of the Non-Intra ESOBU cluster are used to indicate the type of ESOBU. More specifically, the 1 STREF_SZ of the Non-Intra ESOBU assumes zero, and its ENTRY_flag assumes FFh (or 0xff). In the case of non-entry ESOBUs in the Non-Intra ESOBU cluster, the 1 STREF_SZ and ENTRY_flag values assume zero (or 0x00).

The ESOBU size of the Non-Intra ESOBU cluster amounts to a total of the ESOBU_SZ values of all the ESOBUs which belong to that cluster. In this case, the size of each ESOBU in the cluster carries no special significance, and the total size is significant.

In the Non-Intra ESOBU cluster, the ESOBU_S_PKT_POS is the same as that of the Non-Intra ESOBU in that cluster, and the ESOBU_S_PKT_POS values of all the non-entry ESOBUs assume zero.

The ESOBU_PB_TM of the Non-Intra ESOBU cluster amounts to a total of all the ESOBUs which belong to that cluster. In this case, the playback time of each ESOBU in the cluster carries no special significance, and the total playback time is significant. Note that the ESOBU_PB_TM values of all ESOBUs which belong to the Non-Intra ESOBU cluster are avoided from assuming zero.

In the example of FIG. 10, the Non-Intra ESOBU cluster is configured by non-intra SOBUs (Non-Intra ESOBUs), and this Non-Intra ESOBU is an access unit which does not include any reference picture (I-picture in MPEG-2) at its head position but starts with a sequence header. Other than MPEG02, a similar access unit which does not include any reference picture at its head position is a Non-Intra ESOBU.

The Non-Intra ESOBU starts with a Non-Intra Video Access Packet (not shown), and the payload of the Non-Intra Video Access Packet starts with a Non-Intra Video Access Point of a target video stream. The default definition of the Non-Intra Video Access Packet is as follows unless otherwise specified. That is, in the case of MPEG-1 or MPEG-2 video, the first byte of a PES packet including an access unit that starts with a sequence header but does not include any I-picture is a default Video Access Point (note that the access unit is defined in the MPEG-2 system). In the Non-Intra ESOBU, the ESOBU playback time specified by the ESOBU_PB_TM (FIG. 12) does not assume zero and is equal to or shorter than 2.002 sec.

The SOBU_MODE in the ESOB_TY included in the management information (ESOBI/ESOBI_GI in FIG. 6) can described whether or not a stream object (ESOB) can include Non-Intra ESOBUs. For example, when the SOBU_MODE is set to be 01b, one or more Non-Intra ESOBUs can exist in that ESOB. In this case, whether or not to reproduce that ESOB depends on the device design. That is, when the SOBU_MODE is set to be 01b, a player which ignores the whole ESOB can exist. For this reason, it is preferable even for a recorder that can use Non-Intra ESOBUs not to generate any Non-Intra ESOBU and not to set the SOBU_MODE to be 01b (in terms of compatibility) unless the need arises (for example, unless a stream in which an I-picture is not found for a long period of time need be recorded). In this sense, in the embodiment, not only recording and reproducing of Non-Intra ESOBUs but also those of normal ESOBUs (including an I-picture or reference picture) are allowed.

Note that not only the SOBU_MODE (FIG. 6) but also the ENTRY_flag (FIG. 12) in the ESOBU_ENT can indicate whether or not one or more Non-Intra ESOBUs exist in that ESOB.

Figure 11:
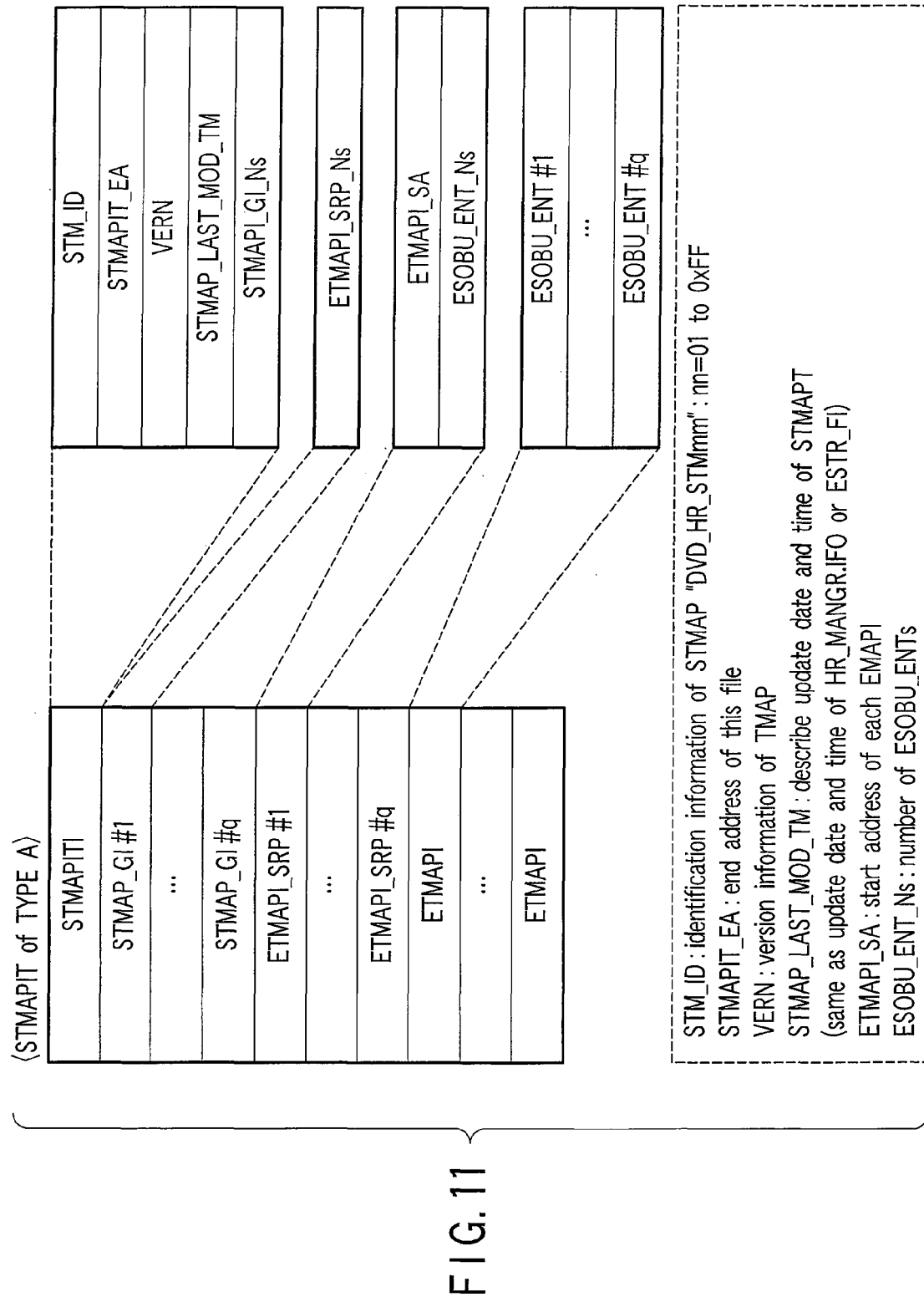
FIG. 11 is an exemplary view for explaining an example of the configuration of a stream time map information table (a presentation time-based STMAPIT of type A) as a part of management information.

FIG. 11 is a view for explaining an example of the configuration of a stream time map information table (STMAPIT of type A on the playback time base) as a part of the management information. As shown in FIG. 11, the STMAPIT of type A on the PTM base is configured to include STMAPIT identification information (STM_ID), end address information (STMAPIT_EA) of the STMAPIT, version information (VERN) of the TMAP of interest, update date and time information (STMAPI_LAST_MOD_TM: the same value as the update date and time information value of VMGI or ESTR_FI) of the STMAPI, the number of pieces of STMAPI_GI (STMAPI_GI_Ns), and the like. The STMAPI_GI includes the number of ETMAPI_SRPs (ETMAPI_SRP_Ns) which belong to the STMAPI_GI, and ETMAPs which belong to the STMAP are determined in the number sequence from the first one. Each ETMAPI_SRP is configured to include start address information (ETMAPI_SA) to the ETMAPI, and the number of ESOBU_ENTs (ESOBU_ENT_Ns). The ETMAPI includes one or more ESOBU_ENTs. Note that garbage data may be inserted among ESOBU_ENTs.

FIG. 12 is a view for explaining an example of the configuration of entry information of a data unit (ESOBU_ENT of type A) as a part of the management information. The ESOBU_ENT of type A, i.e., of the PTM base is configured to include end address information (LB units) from the head of the ESOBU of the first reference picture (I-picture or the like) in the entry, an ESOBU playback time (the number of fields), an ESOBU size (the number of packet groups that belong to the ESOBU), and ESOBU_S_PKT_POS (the number of packets from the head of a packet group that stores the first packet of the ESOBU of interest).

When the ESOBU of that entry does not include any I-picture (reference picture) (in the case of a Non-Intra ESOBU or Non-Entry ESOBU), the 1 ST_REF_PIC_SZ assumes 00h. Furthermore, the ENTRY_flag assumes 0xff in the case of a Non-Intra ESOBU, and 0x00 in the case of a Non-Entry ESOBU, thereby distinguishing the Non-Intra ESOBU and Non-Entry ESOBU from each other.

In other words, FIG. 12 is an exemplary view for explaining an example of the configuration of the ESOBU_ENT (e.g., ESOBU_ENT#1) shown in FIG. 11. This ESOBU_ENT#1 includes information indicating the number of packs or the number of TS packets of the 1 st_Ref_PIC, an ESOBU playback time (ESOBU_PB_TM; corresponding to the number of video fields or the number of video frames), and an ESOBU size (ESOBU_SZ; which can be expressed by the number of TS packets, the number of packs, or the number of packet groups). First reference picture 1 st_Ref_PIC is a frame picture or field pair which is allocated at the head of the GOP, and can determine an output video picture using information of that picture alone. Note that the frame picture indicates a picture in case of the frame structure, and a field pair indicates two field pictures which define one frame video picture in case of the field structure.

Figure 13:
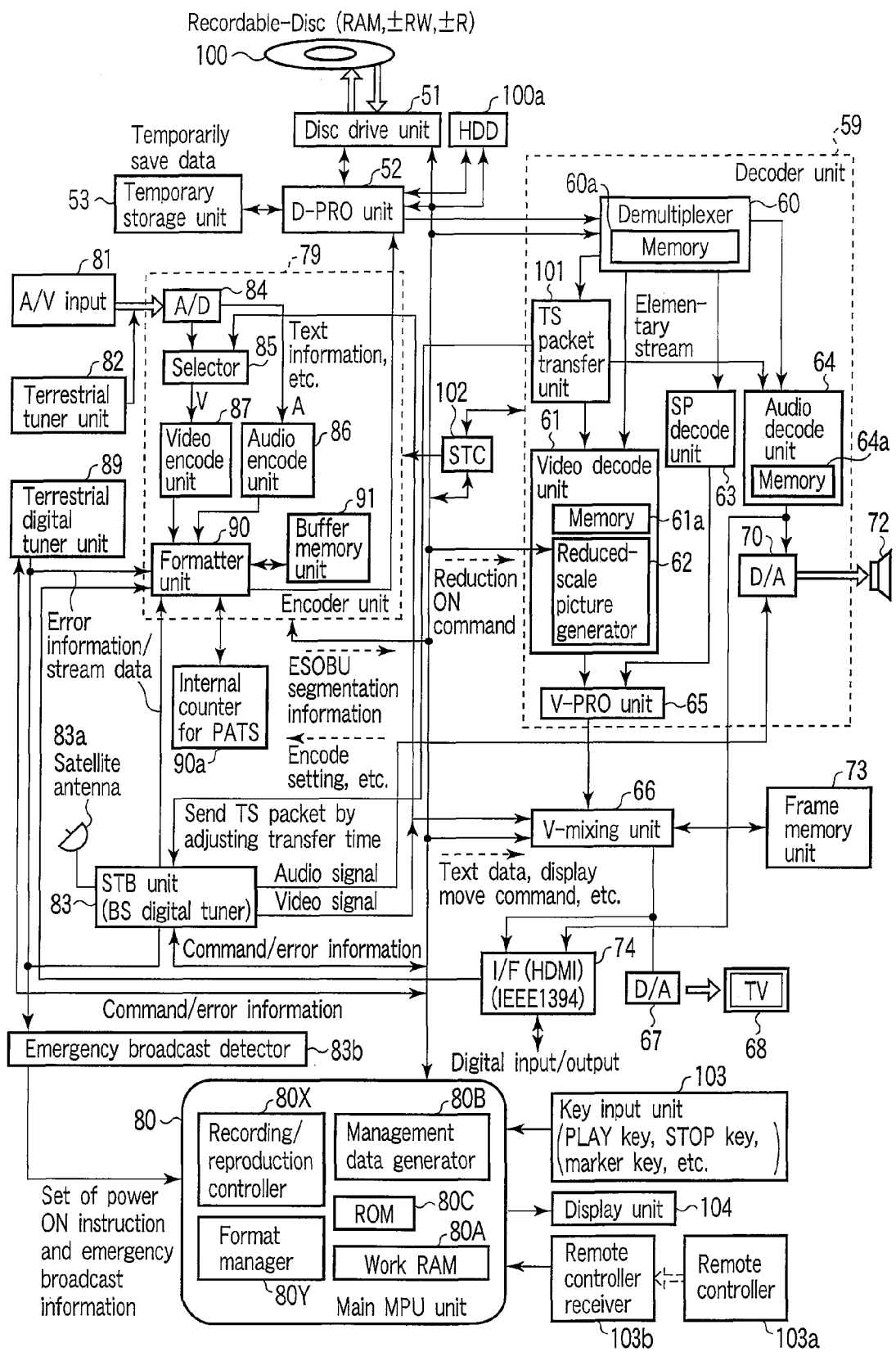
FIG. 13 is an exemplary block diagram for explaining an example of an apparatus for recording and reproducing AV information (digital TV broadcasting program and the like)

FIG. 13 is a block diagram for explaining an example of an apparatus which records and reproduces AV information (digital TV broadcasting program or the like) on an information recording medium (optical disc, hard disc, or the like) using the data structure according to the embodiment. As shown in FIG. 11, this recording and reproducing apparatus comprises MPU unit 80, display unit 104, decoder unit 59, encoder unit 79, TV tuner unit 82, STC unit 102, D-PRO unit 52, temporary storage unit 53, disc drive unit 51, key input unit 103, video mixing unit 66, frame memory unit 73, TV digital-to-analog conversion unit 67, terrestrial digital tuner unit 89, IEEE 1394 (and/or HDMI) I/F unit 74, Ethernet® I/F unit (not shown), remote controller receiver 104, STB unit (BS digital tuner or the like) 83, emergency broadcast detection unit 83b, HDD unit 100a, and the like. This arrangement is configured by adding the functions of a streamer to a recordable/reproducible DVD recorder.

Encoder unit 79 comprises analog-to-digital conversion unit 84, video encode unit 87, audio encode unit 86, subpicture encode unit (not shown), formatter unit 90, buffer memory unit 91, and the like. Decoder unit 59 comprises demultiplexer 60, video decode unit 61, sub-picture decode unit 63, audio decode unit 64, TS packet transfer unit 101, V-PRO unit 65, audio digital-to-analog conversion unit 70, and the like. Furthermore, antenna 83a for receiving digital broadcasting is connected to STB unit 83. Note that STC unit 102 is configured to count on a 27-MHz base.

The flow of signals upon recording is as follows. That is, formatter unit 90 packs TS packet data received by STB unit 83 (or terrestrial digital tuner 89) into packet groups and temporarily saves these packet groups on buffer memory unit 91. When the saved packet groups reach a predetermined size, they are recorded on disc 100 and/or HDD 100a. PATS internal counter 90a is connected to this formatter unit 90. The arrival time of each TS packet is counted by PATS counter 90a, and that count value is appended to the head of each TS packet when the packet is buffered in buffer memory unit 91. This counter 90a attains synchronization by finely adjusting count intervals based on PCR (or SCR) values, but never loads the PCR (or SCR) values unlike STC 102.

As the operations to be executed at that time, upon reception of TS packets, a packet group is formed every 170 packets, and a packet group header is generated. In this case, only the upper 2 bytes of the PATS of the first Packet of the Packet Group are stored in the header (FIRST_PATS_EXT), and only the lower 4 bytes of each of other PATS data are saved together with the TS packet (in the PATS before the TS packet). An analog signal input from terrestrial tuner 82 or an line input is converted into a digital signal by analog-to-digital conversion unit 84. That digital signal is input to respective encode units. That is, a video signal is input to video encode unit 87, an audio signal is input to audio encode unit 86, and text data of, e.g., teletext broadcasting is input to the SP encode unit (not shown). In this case, the video signal is compressed by MPEG, the audio signal is compressed by MPEG audio, and the text data is compressed by runlength coding.

Each of the encoder unit (for VR) packs output compressed data to form 2048-byte packets and inputs them to formatter unit 90. Formatter unit 90 packs and multiplexes the packets as a program stream, and sends them to D-PRO unit 52.

D-PRO unit 52 forms ECC blocks for every 16 Logical Blocks, appends error correction data to them, and records the ECC packets on disc 100 (or HDD 100a) via disc drive unit 51. When disc drive unit 51 is busy due to seek, track jump, and the like, recording information is temporarily stored in temporary storage unit 53 until disc drive unit 51 is ready. Furthermore, formatter unit 90 generates each piece of segmentation information during video recording, and periodically sends these pieces of information to MPU unit 80 (GOP head interrupt or the like). The segmentation information includes the number of packs of an EVOBU (ESOBU), the end address of reference picture (I-picture) data from the head of the EVOBU (ESOBU), the playback time of the EVOBU (ESOBU), and the like.

In the flow of signals upon reproduction, data are read out from disc 100 (or HDD 100a) by disc drive unit 51, undergo error correction by D-PRO unit 52, and are then input to decoder unit 59. MPU unit 80 determines the type of input data (i.e., VR or SR data) (based on the cell type), and sets that type in decoder unit 59 before reproduction. In the case of SR data, MPU unit 80 determines the PID to be reproduced based on the ESI number to be reproduced, determines the PIDs of items (video, audio, and the like) to be reproduced based on a PMT, and sets them in decoder unit 59. In decoder unit 59, demultiplexer 60 sends TS packets to the respective decode units 61 to 64 based on the PIDs. Furthermore, demultiplexer 60 sends the TS packets to TS packet transfer unit 101, which transmits them to STB unit 83 (and IEEE1394 I/F unit 74) in accordance with their arrival times in the form of TS packets. Respective decode units 61 to 64 execute decoding, and digital-to-analog conversion unit 67 converts decoded data into an analog signal, thus displaying the signal on TV 68. In the case of VR data, demultiplexer 60 sends data to respective decode units 61 to 64 according to the fixed IDs. Respective decode units 61 to 64 execute decoding, and digital-to-analog conversion unit 67 converts decoded data into an analog signal, thus displaying the signal on TV 68.

In the flow of signals upon recording, formatter unit 90 converts TS packet data received by STB unit 83 (or terrestrial digital tuner 89) into packet groups, and saves the packet groups in work RAM 91. When data stored in this work RAM reach a predetermined size (for one or an integer multiple of CDA size), they are recorded on disc 100 (and/or HDD 100a). As the operations to be executed at that time, upon reception of TS packets, a packet group is formed every 170 packets, and a packet group header (packet group header 161 in FIG. 1) is generated. That is, the following operation is made.

1) A TS packet is received.
2) It is checked if the STC has reached an end (Wraparound). If the STC has reached an end, a part (CNT_SEG information: CNT_SEGI) of management information is generated based on its position information. Note that the ESOBI includes discontinuity information ESOB_DCNI of ESOBs (not shown), and this ESOB_DCNI includes one or more pieces of CNT_SEGI. Each CNT_SEGI includes CNT_SEG_SZ (CNT_SEG size: the number of Packet Groups) and CNT SEG PKT POS (the number of Packets of the head position of the CNT_SEG in a Packet Group). From these pieces of information, whether or not the count operation of system time counter STC of the recording and reproducing apparatus has reached an end (Wrap-around) can be indicated. In this manner, the number of CNT_SEGs from the head of an ESOB is set in time information PTM to confirm in advance if STC wrap-around occurs, and such data can be used in TMAP calculations and the like.

3) If the packet of interest is the first one of a packet group, Header_ID: 0x00000fa5 is set; otherwise, the control advances to process 5).

4) The arrival time of the TS packet is used as PATS data, the lower 4 bytes of the PATS data are allocated before that TS packet, and the upper 2 bytes of the first PATS data are set in the Packet Group Header (packet group header 161 in FIG. 1) as FIRST_PATS_EXT. Then, the process advances to 6).

5) In the TS packet fetched in the TS packet data area, the lower 4 bytes of the PATS data are appended before that TS packet, and the TS packet is set in a Packet Group data area.

6) It is checked if a packet group is formed (if 170 TS packets are grouped). If a packet group is not formed yet, the process returns to 1). If a packet group is formed, CCI processing and MNFI processing are executed, and group data for one packet group are temporarily saved in the buffer RAM.

Upon reproduction, demultiplexer 60 analyzes pack data read out from disc 100 and/or HDD 100*a*. If a pack stores TS packets, demultiplexer 60 sends TS packets to TS packet transfer unit 101, and then sends them to decoders 61 to 64 to reproduce them. Upon transmitting TS packets to STB unit 83 (or upon transmitting them to an external device such as a digital TV or the like via IEEE1394 or the like), TS packet transfer unit 101 transfers only TS packets at the same time intervals as those upon arrival of these data. STB unit 83 decodes TS packets to generate an AV signal, and displays the AV signal on TV 68 or the like via a video encoder unit in a streamer.

The features of medium 100 (or HDD 100*a*) used in the apparatus of FIG. 13 will be briefly summarized below. That is, this medium has management area 130 and data area 131. The data area separately records data as a plurality of object data (ESOBs), and each object data includes a group of data units (ESOBUs). One data unit (ESOBU) includes packet groups each of which is formed by converting an MPEG-TS compatible digital broadcasting signal into TS packets and packing a plurality of packets (see FIG. 1). On the other hand, management area 130 has EX_PGC information (EX_PGCI) as information used to manage the reproducing sequence. This EX_PGC information includes cell information (EX_CI). Furthermore, management area 130 has information used to manage object data (ESOB).

The apparatus shown in FIG. 13 can make stream recording on medium 100 (HDD 100*a*) with the above data structure in addition to video recording. In this case, MPU unit 80 is configured to have a service information extraction unit (not shown; firmware that partially configures management data generator 80B), so as to extract program map table PMT and service information SI from a TS packet stream. Also, MPU unit 80 is configured to have an attribute information generation unit (not shown; firmware that partially configures management data generation unit 80B) that generates attribute information (PCR pack number, PCR LB count number, and the like) based on information extracted by the service information extraction unit. MPU unit 80 further comprises firmware that implements the processes of FIGS. 14 to 17, FIGS. 21 to 23, and the like as format manager 80Y.

A plurality of media such as disc 100, HDD 100*a*, and the like exemplified in FIG. 13 may be used, for example, as follows. That is, stream recording is made on HDD 100*a* using the data structure (format) shown in FIGS. 1 to 12. Of stream recording contents recorded on HDD 100*a*, a program that the user wants to preserve is stream-recorded intact on disc 100 (a content which is not copy-controlled is directly copied or digitally dubbed on disc 100; a copy-once content is digitally moved to disc 100). In this way, only needed programs which have quality equivalent to originals of the digital broadcasting can be held together on disc 100. Furthermore, since the stream recording contents copied to disc 100 use the data structure of the embodiment, they easily allow special reproduction such as time search and the like irrespective of stream recording.

Recording/reproducing control of stream recording or video recording is executed by firmware (control programs corresponding to the operations of FIGS. 14 to 23 to be described later) of main MPU unit 80. MPU unit 80 has management data generator 80B of stream recording and video recording, generates various kinds of management information (FIGS. 2 to 12 and the like) using work RAM 80A as a work area, and records the generated management information on AV data management information recording area 130 shown in FIG. 1 as needed. MPU unit 80 reproduces the management information recorded on AV data management information recording area 130, and executes various kinds of control (FIGS. 14 to 23) based on the reproduced management information.

FIG. 14 is a flowchart for explaining an example of the overall operation of the apparatus. In this case, data processes include five different processes, i.e., a video recording process, reproducing process, data transfer process (a digital output process to the STB or the like), program setting process, and edit process. For example, when the power switch of the apparatus in FIG. 13 is turned on, MPU unit 80 makes initial settings (upon factory shipment or after user's settings) (ST10), and also makes display settings (ST12). If the user has made a key input from key input unit 103 or remote controller 103*a* in FIG. 11 (ST14), MPU unit 80 interprets the content of that key input (ST16). The following five data processes are executed as needed in accordance with this input key interpretation result. That is, if the key input is, for example, a key operation made to set timer program recording, MPU unit 80 enters a program setting process (ST20). If the key input is a key operation made to start video recording, MPU unit 80 enters a video recording process (ST22). If the key input is a key operation made to start reproduction, MPU unit 80 enters a reproducing process (ST24). If the key input is a key input made to output digital data to the STB, MPU unit 80 enters a digital output process (ST26). If the key input is a key operation of an edit process, MPU unit 80 enters the edit process (ST28).

MPU unit 80 parallelly executes the processes in blocks ST20 to ST28 as needed for respective tasks. For example, MPU unit 80 parallelly executes the process for outputting digital data to the STB (ST26) during the reproducing processing (ST24). Or, MPU unit 80 can parallelly execute the new program setting process (ST20) during the video recording processing (ST22) which is not timer program recording.

Or, by utilizing the feature of disc recording that allows high-speed access, MPU unit 80 can parallelly execute the reproducing process (ST24) and digital output process (ST26) during the video recording process (ST22). Also, MPU unit 80 can parallelly execute the disc edit process (ST28) during video recording on the HDD.

FIG. 15 is a flowchart (edit operation processing sequence) for explaining an example of the edit process (ST28). When the control enters the edit process, the process branches to one of four processes (one of A to D) (ST280) in accordance with the edit content. Upon completion of one of an entry point menu process (ST282A), copy and move process (ST282B), delete process (ST282C), and playlist generation process (ST282D), MPU unit 80 sets the program update date and time by this edit process in respective pieces of management information (program information EX_PGI, item text information EX_IT_TXT, manufacturer information EX_MNFI) (ST284).

When one of the program information EX_PGI, cell information EX_CI, or EVOB or ESOB data has been changed, MPU unit 80 may set this program update date and time. When EVOBI and/or ESOBI have/has been changed, MPU unit 80 can set the edit times/time (EDIT_TIME) of the EVOBI and/or ESOBI in ESOB_EDIT_TIME (not shown) or the like. Alternatively, MPU unit 80 may set this program update date and time.

In this connection, in the process in block ST284, MPU unit 80 may set the manufacturer ID of the apparatus that has made the operation in one of blocks ST282A to ST282D in an editor ID (LAST_MNF_ID: not shown) in management information (VMG). Every time one of the PGI, CI, and ESOB (or EVOB) has been changed, MPU unit 80 can set (or update) this editor ID to the ID information of the apparatus used at that time.

Figure 16:
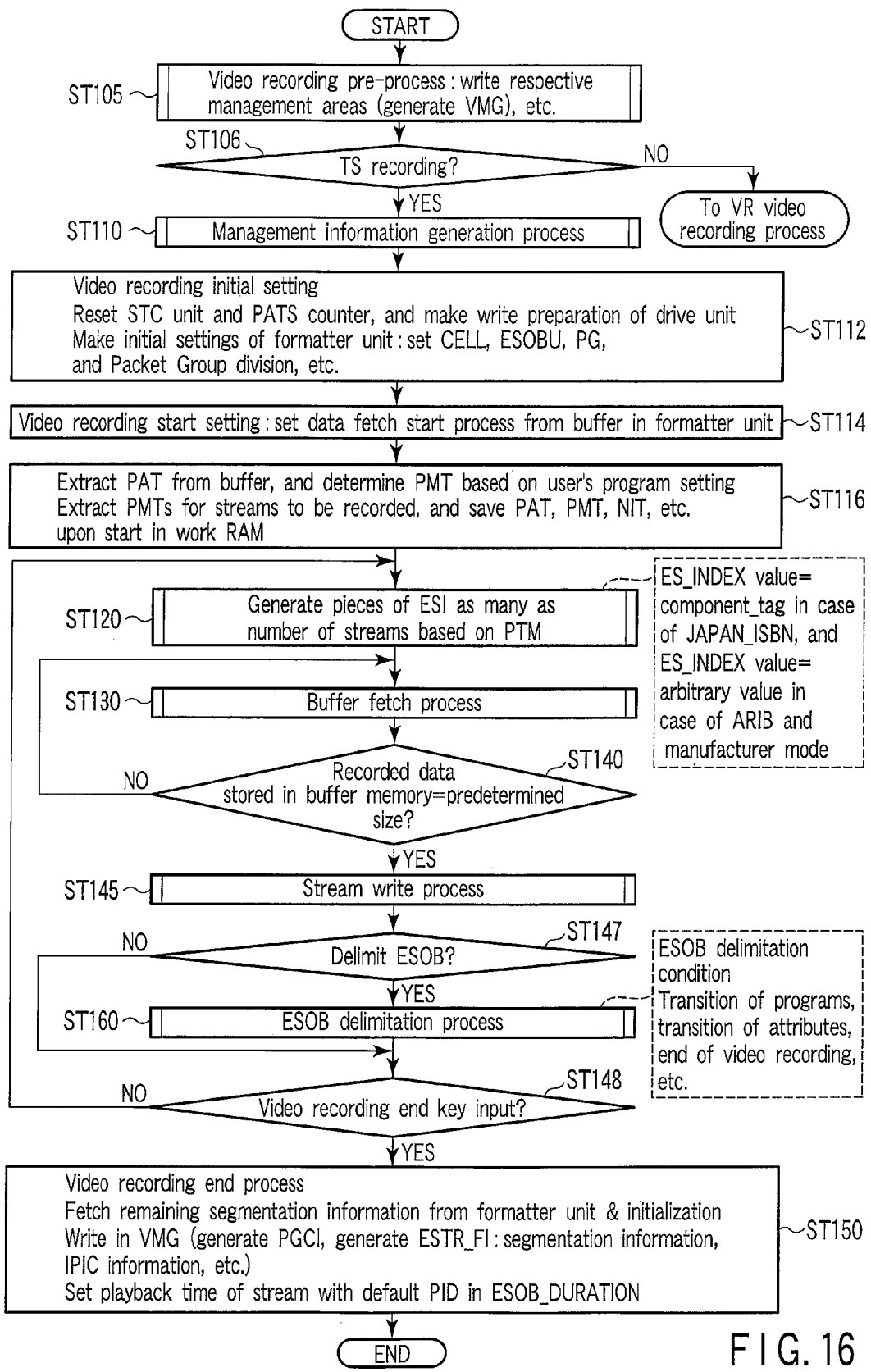
FIG. 16 is an exemplary flowchart for explaining an example of a video recording operation.

FIG. 16 is a flowchart for explaining an example of the video recording operation. Data processes upon video recording are as follows.

11) MPU unit 80 allows the user to determine a program to be recorded using EPG (Electronic Program Guide) in the program setting process. After that, when the video recording start time has been reached, MPU unit 80 starts reception of that program, and enters video recording of that program.

12) Upon reception of a video recording command from key input unit 103, remote controller 103*a*, or a program recording program (not shown), MPU unit 80 (FIG. 13) loads management data from disc drive unit 51 (or HDD 100*a*) and determines a write area. At this time, MPU unit 80 checks the file system to determine whether or not to proceed with video recording (for example, MPU unit 80 checks if the recordable time obtained by converting a non-recorded area size of a recording destination medium based on the video recording rate has a duration long enough to record the program). If video recording can be proceeded, MPU unit 80 determines the recording position (a specific free area of the recording destination medium); otherwise, it displays a message that advises accordingly for the user and aborts the video recording process.

13) MPU unit 80 sets the management area to write data in the determined area, and sets the write start address of video data in the disc drive unit, thus preparing for recording of the program data (ST105). If the program to be recorded is digital broadcasting data (an object is an MPEG-TS stream), is re-encoded to MPEG-PS data, and is recorded in the VR mode (NO in ST106), the control advances to a VR video recording process.

14) If the digital broadcasting data is to be stream-recorded as an MPEG-TS intact (YES in ST106), MPU unit 80 generates management information according to the broadcasting scheme (ST110). In this management information generation process (ST110), MPU unit 80 checks the application format (broadcasting scheme and the like) of the digital stream to be recorded. The embodiment identifies three application formats, i.e., ISDB of Japan, ATSC of U.S.A., and a Manufacturer mode other than these broadcasting schemes. As navigation data for ISDB of Japan, values exemplified in FIG. 24 are used. As navigation data for ATSC of U.S.A. and ISDB of cable broadcasting, values exemplified in FIG. 25 are used. As navigation data for the Manufacturer mode, values exemplified in FIG. 26 are used.

15) Upon completion of generation of the management information, MPU unit 80 resets the time of STC unit 102 (FIG. 13) in video recording initial settings (ST112). Note that STC unit 102 is a system timer, and video recording and/or reproduction are or is done with reference to this STC value. MPU unit 80 also makes initial settings in formatter unit 90. In video recording start settings after the initial settings of formatter unit 90, MPU unit 80 begins to fetch data into buffer memory unit 91 (FIG. 13) of the formatter unit (ST114).

16) MPU unit 80 loads the PAT of a program to be recorded to determine the PID used to fetch the PMT of the target program. Then, MPU unit 80 loads the target PMT to determine the PIDs of data (video, audio) to be decoded (to be recorded) (ST116). At this time, MPU unit 80 saves the PAT, PMT, NIT, and the like in work RAM unit 80A, and then writes them in the management information. After completion of video recording, MPU unit 80 writes VMG file data in the file system, and writes the necessary information in VMGI.

17) The description will revert to that of the previous process. MPU unit 80 makes video recording settings in respective units (ST112). At this time, MPU unit 80 makes segmentation settings of respective data and reception settings of TS packets in formatter unit 90. Also, MPU unit 80 sets the PID of data to be recorded to record only a target stream. Furthermore, MPU unit 80 sets buffer 91 to start holding of TS packets.

18) Formatter unit 90 generates ESOB_ESI (FIG. 7) based on the PMT (ST120).

19) Next, formatter unit 90 executes a buffer fetch process (ST130). If data stored in buffer 91 reaches a predetermined size (YES in ST140), formatter unit 90 executes an ECC process via D-PRO unit 52 (FIG. 13), and records the data on disc 100 (or HDD 100*a*) (ST145).

20) During video recording, formatter unit 90 saves segmentation information in work RAM 80A of MPU unit 80 periodically (before buffer RAM 91 becomes full of data). The segmentation information to be saved is ESOBU segmentation information, which includes the ESOBU start address, ESOBU pack length, I-picture end address, playback time, Packet arrival time (PATS), or the like.

21) MPU unit 80 checks if ESOB data are to be delimited. If ESOB data are to be delimited (YES in ST147), MPU unit 80 executes an ESOB delimitation process (ST160).

22) MPU unit 80 checks if video recording is to end (if the user has pressed a video recording end key or if no recordable space remains). If video recording is to end (YES in ST148), MPU unit 80 fetches the remaining segmentation information from formatter unit 90, and adds the fetched information to work RAM 80A. MPU unit 80 records these data in management data (VMGI), records the average recording rate upon video recording, and further records the remaining information in the file system (ST150).

23) If video recording is not to end (NO in ST148), the process returns to block ST120 to continue the data fetch process (ST130) and recording process (ST145).

Figure 17:
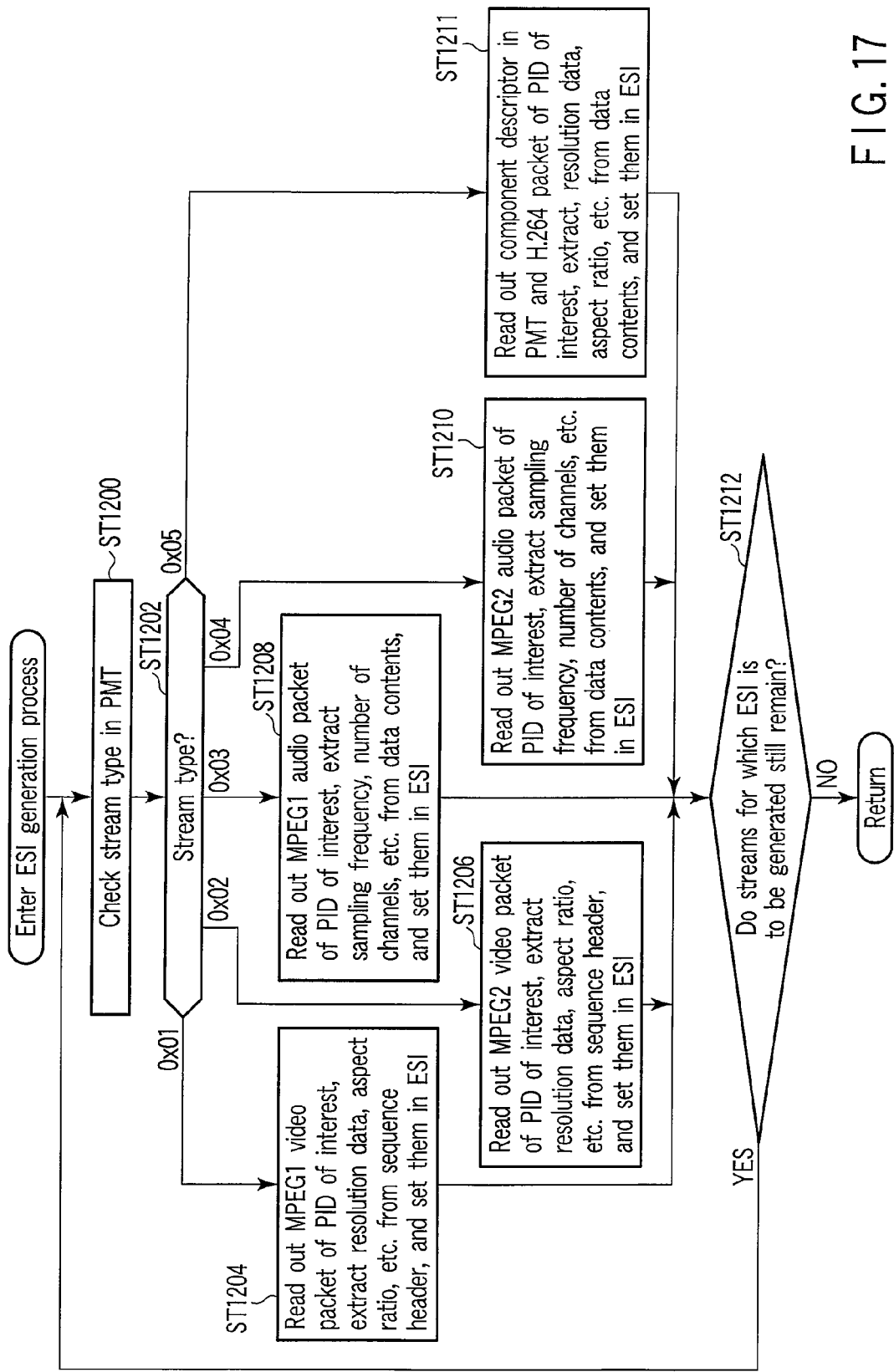
FIG. 17 is an exemplary flowchart (ESI generation processing sequence) for explaining an example of ESI (elementary stream information) generation processing.

FIG. 17 is a flowchart (ESI generation processing sequence) for explaining an example of the elementary stream information generation process (ST120) shown in FIG. 16. In stream recording that records an MPEG-TS, a stream to be recorded includes the PMT which describes a stream type (see FIGS. 7 and 8).

In the ESI generation process (ST120), formatter unit 90 checks a stream type (FIG. 8) in the PMT (ST1200, ST1202). If a stream type="0x01", formatter unit 90 executes an MPEG-1 video ESI setting process (ST1204). If a stream type="0x02", formatter unit 90 executes an MPEG-2 Video ESI setting process (ST1206). If a stream type="0x03", formatter unit 90 executes an MPEG-1 Audio ESI setting process (ST1208). If a stream type="0x04", formatter unit 90 executes an MPEG-2 Audio ESI setting processing (ST1210). If a stream type="0x05", formatter unit 90 executes an MPEG-4 AVC (or H.264) ESI setting processing (ST1211). Although not shown, if a stream type="0x066", formatter unit 90 executes a VC-1 ESI setting processing. Formatter unit 90 checks internal data for each stream type, and sets respective pieces of attribute information. Upon completion of generation (setting processes) of ESI for all streams (NO in ST1212), the control exists the processing in FIG. 17 and advances to block ST130 in FIG. 16.

There are two types of video data: the frame structure and field structure. In the frame structure, one frame image configures a picture of the entire frame. In the field structure, two field images of top and bottom fields form one frame image to configure a picture of the entire frame.

Figure 18:
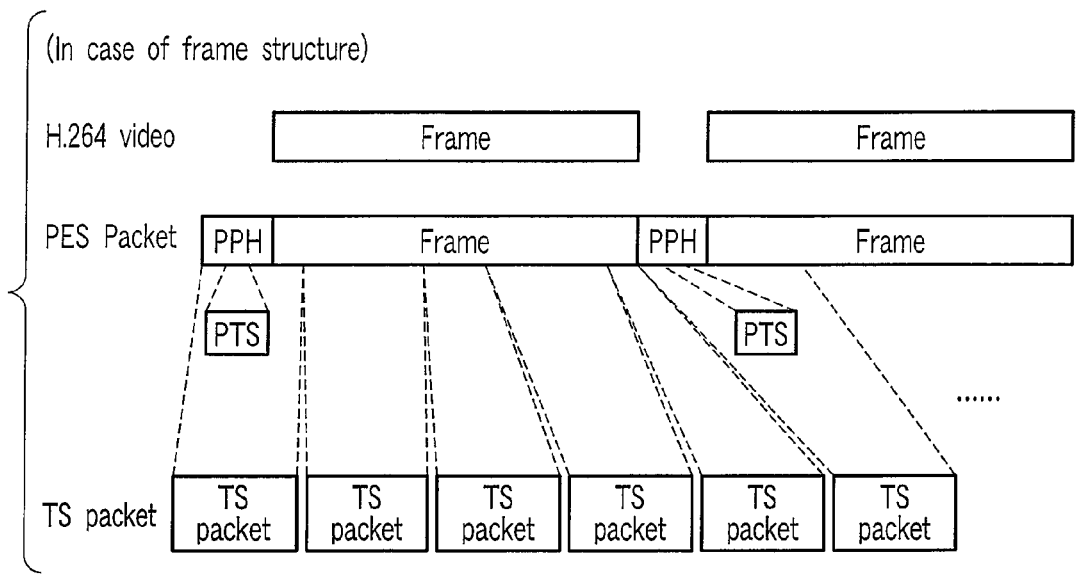
FIG. 18 is an exemplary view for explaining an example (a case of the frame structure) of how to configure H.264 packets from source H.264 video data.

FIG. 18 is a view for explaining an example (a case of the frame structure) of how to configure MPEG-4 AVC or H.264 packets from source H.264 video data. A PES packet header (PPH) is inserted at the head of a frame, and a PES packet is configured by the PPH and frame. The PPH includes a playback start time (PTS: presentation time stamp) of the frame. The PES packet is segmented in correspondence with the size of a TS packet as a payload (payload 180 in FIG. 1) of the TS packet. The last data of the PES packet becomes that of the payload by a method of. e.g., stuffing. That is, the head data of the next PES packet always starts from the head of the payload of the next TS packet.

Figure 19:
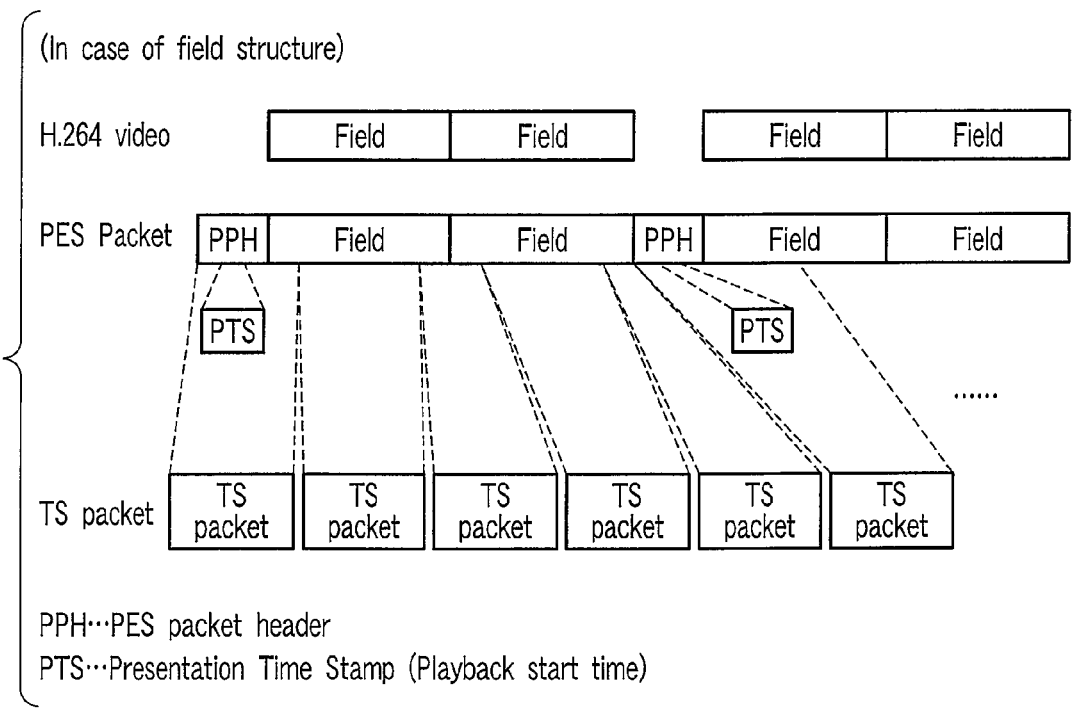
FIG. 19 is an exemplary view for explaining an example (a case of the field structure) of how to configure H.264 packets from source H.264 video data.

FIG. 19 is a view for explaining an example (a case of the field structure) of how to configure MPEG-4 AVC or H.264 packets from source H.264 video data. The PPH is inserted at the head of two fields which configure one frame, and the PES packet is configured by the PPH and two fields. In the same manner as in the frame structure, the PPH includes a playback start time (PTS: presentation time stamp). The configurations of the PES packet and TS packet are the same as those of the frame structure.

Figure 20:
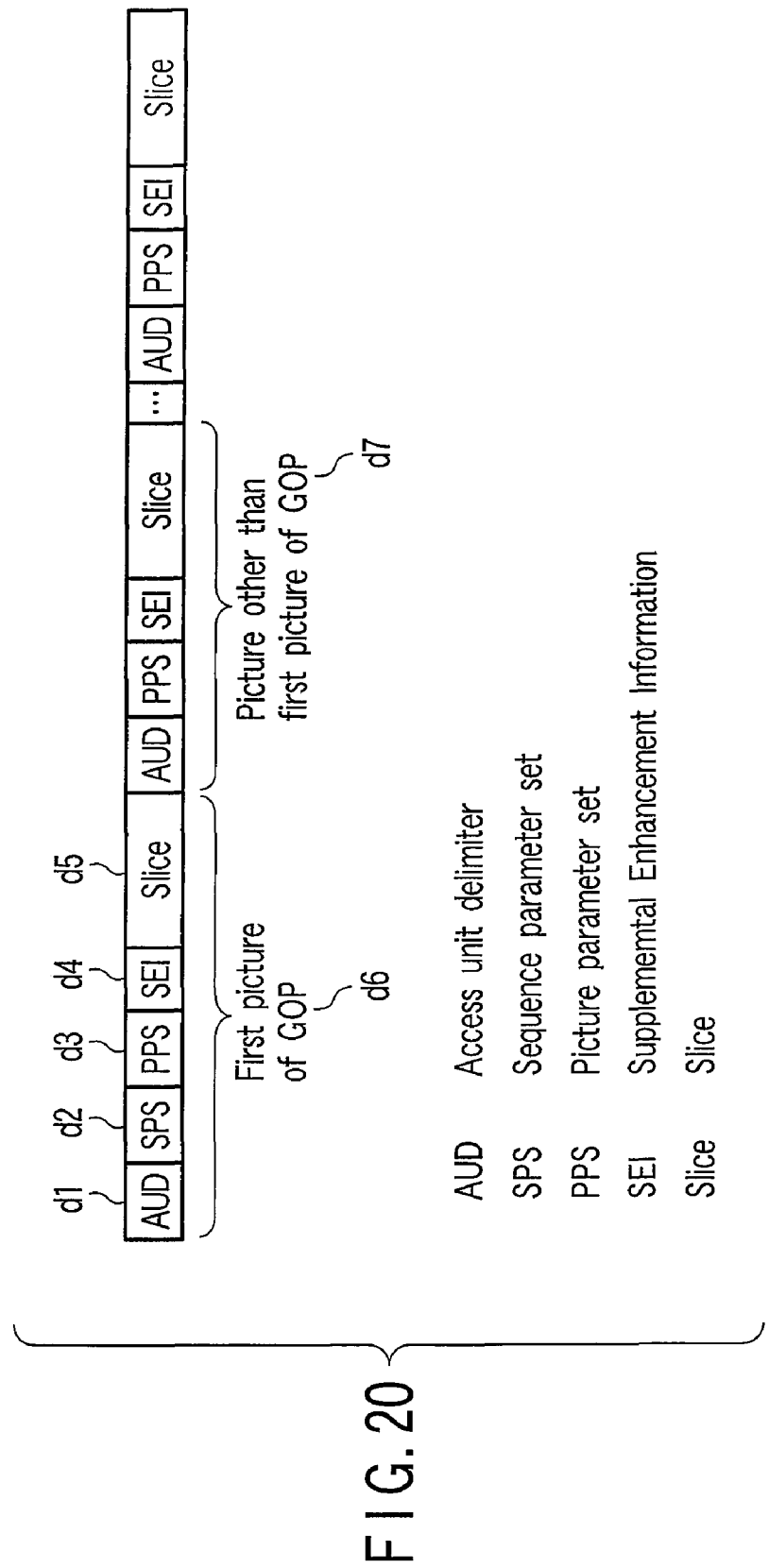
FIG. 20 is an exemplary view for explaining an example of the configuration of H.264 video data.

FIG. 20 is a view for explaining an example of the configuration of MPEG-4 AVC or H.264 video data. Access unit delimiter (AUD) d1 is a start code assigned to the head of a picture. Sequence parameter set (SPS) d2 is a header including information associated with encoding of the entire sequence. Picture parameter set (PPS) d3 is a header indicating the encoding mode of the whole picture. Supplemental Enhancement Information (SEI) d4 is supplemental enhancement information. Slice (Slice) d5 is data of picture information itself.

A frame in the frame structure or fields in the field structure configure a picture by some pieces of information of data d1 to d5. One or more pictures configure a GOP. Reference numeral d6 denotes the structure of the first picture of the GOP. The first picture of the GOP starts with the AUD, and includes the SPS, PPS, SEI, and Slice. Reference numeral d7 denotes the structure of a picture other than the first picture of the GOP. This picture starts with AUD, and includes PPS, SEI, and Slice. That is, the SPS is included in the first picture of the GOP, and is not included in those other than the first picture of the GOP.

Figure 21:
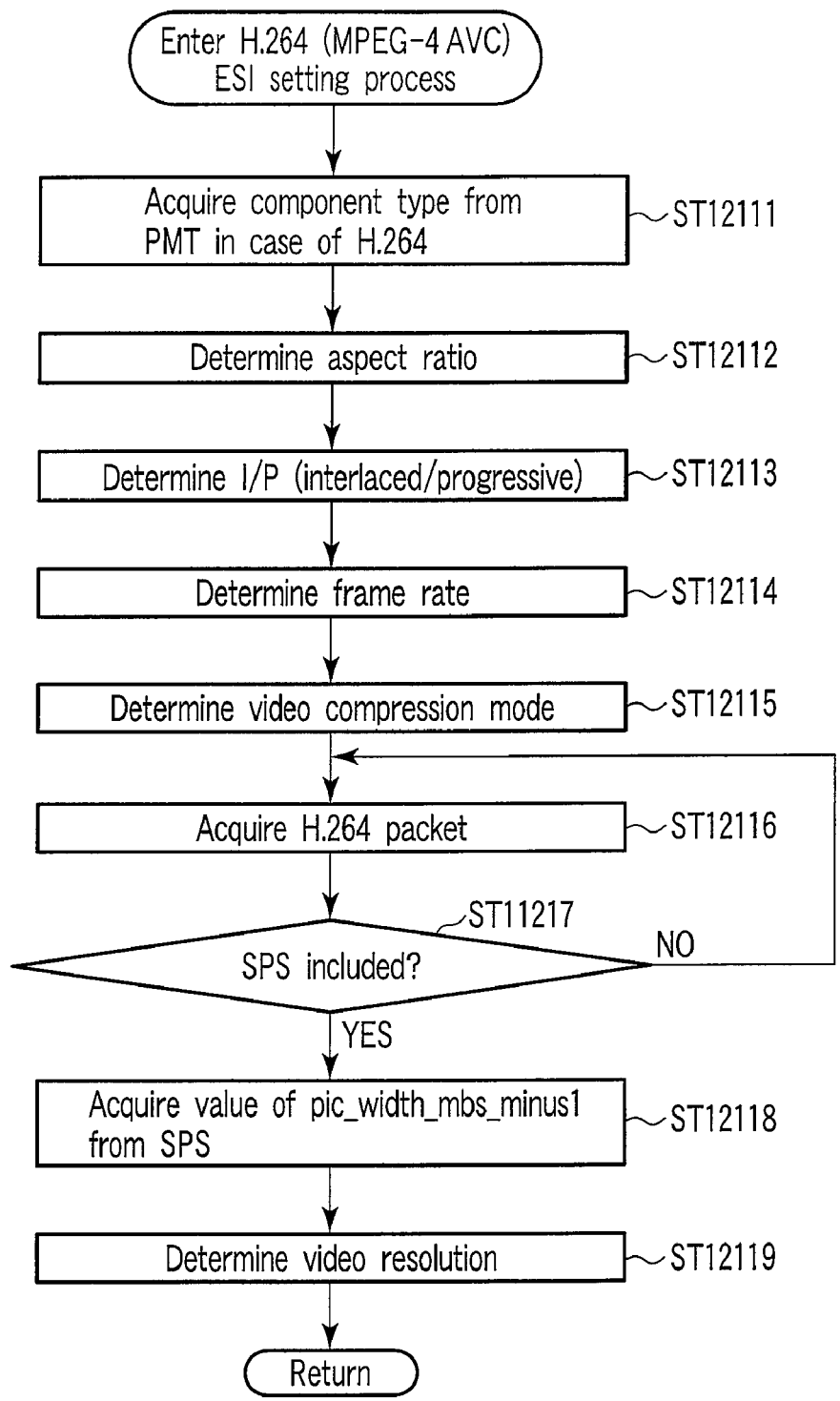
FIG. 21 is an exemplary flowchart showing an example of ESI setting processing in case of H.264.

FIG. 21 is a flowchart showing an example of the ESI setting process in case of MPEG-4 AVC or H.264. In the ESI setting process, MPU unit 80 acquires a component type (ST12111). The component type describes information such as an Aspect Ratio (aspect ratio information), Source resolution (vertical resolution), Source picture Progressive mode (type of interlaced/progressive I/P), frame rate, video compression mode, and the like.

The MPU unit 80 determines the value of an aspect ratio based on the aspect ratio information, and sets it in video attribute V_ATR of the ESI (ESOB_V_ESI in FIG. 7) (ST12112). MPU unit 80 determines a value indicating Progressive, Interlaced, or other based on the type of interlaced/progressive (I/P), and sets it in video attribute V_ATR of the ESI (ST12113). In digital broadcasting standard ARIB, the frame rate in case of interlaced is 30/1.001 (=29.97), and that in case of progressive is 60/1.001 (=59.94). Thus, MPU unit 80 determines the frame rate value based on the type of interlaced/progressive (I/P) and sets it in video attribute V-ATR of the ESI (ST12114). Since the ESI setting process (ST1211 in FIG. 17) is executed when the stream type indicates H.264, MPU unit 80 determines H.264 (MPEG-4 AVC) as the video compression mode, and sets it in video attribute V_ATR of the ESI (ST12115).

In the ESI setting process, MPU unit 80 reads out an H.264 packet based on the PID of interest (ST12116), and checks if the packet includes sequence parameter set (SPS) d2 in FIG. 20 (ST12117). If the packet includes the SPS, MPU unit 80 acquires a value of pic_width_in_mbs_minus1 (not shown) in sequence parameter set (SPS) d2 in the readout packet (ST12118).

The horizontal resolution of this video data can be calculated by:

Horizontal resolution=(pic_width_in_mbs_minus1+1)×16

MPU unit 80 determines the video resolution based on the horizontal resolution calculated using this equation, and the vertical resolution acquired from the component type, and sets it in video attribute V_ATR of the ESI (ST12119). In this way, the video attribute information of the ESI (ESOB_V_ESI in FIG. 7) is set.

Figure 22:
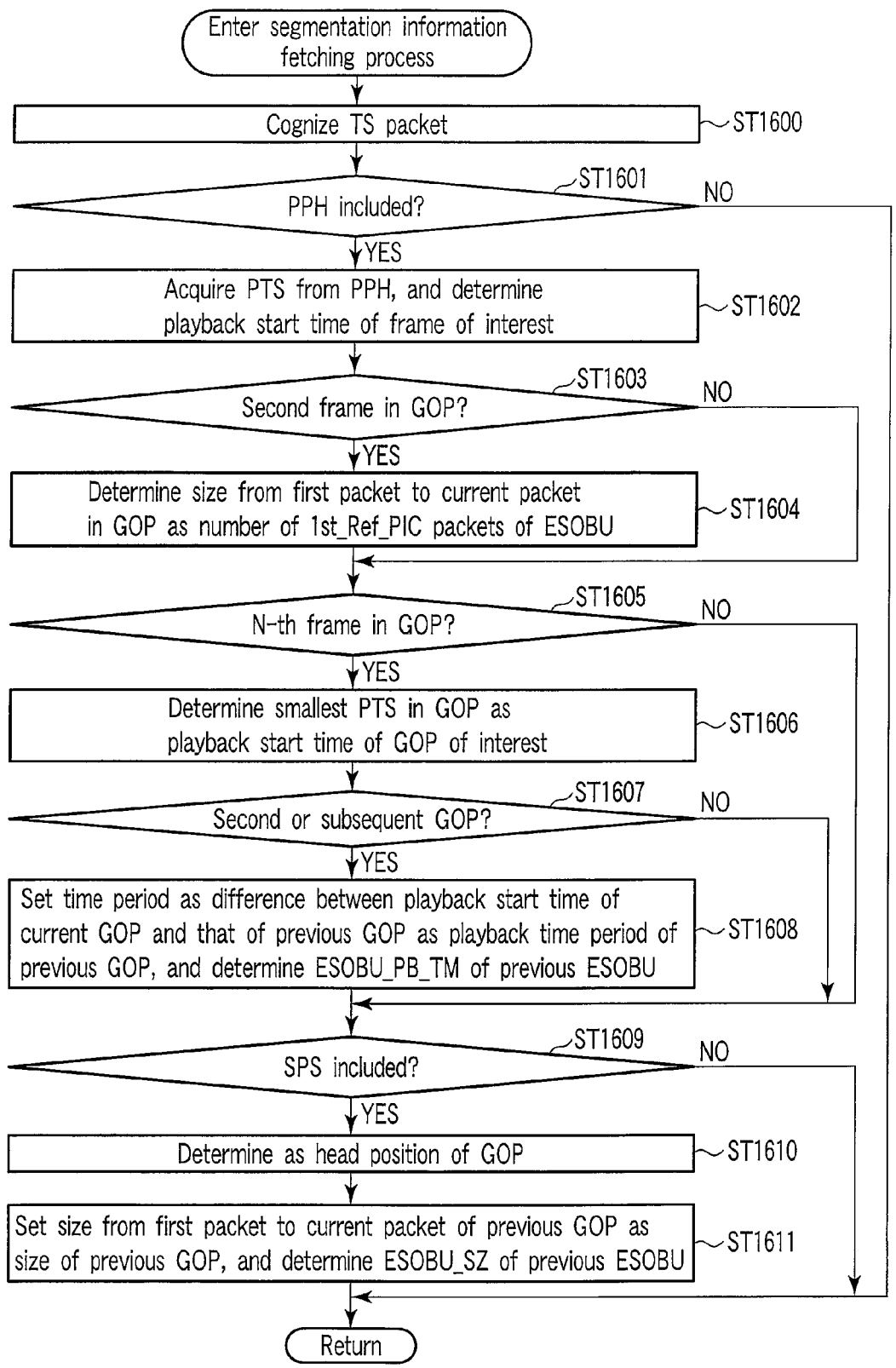
FIG. 22 is an exemplary flowchart for explaining a practical example of segmentation information fetching processing in case of H.264.

FIG. 22 is a flowchart for explaining a practical example of segmentation information fetching processing in case of MPEG-4 AVC or H.264. Assume that it is determined in the video recording initial settings (ST112 in FIG. 16) that an ESOBU is configured by 1 GOP. In H.264, since information of a subsequent frame in the reproduction order is often referred to so as to decode a picture of a given, frames are arranged not in the reproduction order but in the decoding order. Also, assume that numeric value N indicating the position of appearance in the decoding order of the first frame in the reproduction order in the GOP is determined in the video recording initial settings (ST112). Furthermore, assume that the number of frames in the GOP is N or more.

When the segmentation information fetching process starts, MPU unit 80 cognizes a TS packet (ST1600), and checks if a TS packet includes a PES packet header (e.g., PPH in FIG. 18) (ST1601). If the TS packet includes the PPH (YES in ST1601), it is determined that this packet is the first packet of a frame. Therefore, MPU unit 80 acquires presentation time stamp PTS from the PPH, and determines that PTS as the playback start time (ST1602).

MPU unit 80 then checks if the frame of interest is the second frame in the GOP (ST1603). If the frame of interest is the second frame in the GOP (YES in ST1603), MPU unit 80 determines the size from the first packet to the current packet in the GOP as the number of 1st_Ref_PIC packets of the ESOBU (ST1604). Alternatively, MPU unit 80 determines the number of packet groups from the first packet group to the end of Ref_PIC (corresponding to I-picture) of the ESOBU as the first reference picture size (see 1 st_Ref_PIC_SZ in FIG. 12) of that ESOBU (ST1604).

MPU unit 80 checks if the frame of interest is the N-th frame in the GOP (ST1605). If the frame of interest is the N-th frame in the GOP (YES in ST1605), MPU unit 80 determines a PTS with a smallest value in the GOP as the playback start time of that GOP (ST1606).

MPU unit 80 checks if the GOP of interest is the second or subsequent GOP since the video recording start timing (ST1607). If the GOP of interest is the second or subsequent GOP (YES in ST1607), MPU unit 80 sets a time period as a difference between the playback start time of the GOP of interest and that of the previous GOP as a playback time period of the previous GOP, and determines ESOBU_PB_TM of the previous ESOBU (ST1608).

MPU unit 80 checks if the TS packet of interest includes sequence parameter set (SPS) d2 (see FIG. 20) (ST1609). If the TS packet of interest includes SPS d2 (YES in ST1609), that packet is the first packet of the GOP (ST1610). Therefore, MPU unit 80 sets the first packet to the current packet of the previous GOP as the size of the previous GOP to determine ESOBU_SZ of the previous ESOBU (ST1611). In this way, each ESOBU_ENT in FIG. 4 or 12 is set.

In this way, each of one or more stream time maps (ST-MAP#1 to STMAP#n in FIG. 4) included in one field (ESTR_FIT) of the management information includes actual entries of the segmented ESOB time map table. Note that the stream time map in this case is a data table which converts a certain playback time in the ESOB into the address of the corresponding ESOBU included in that ESOB.

Figure 23:
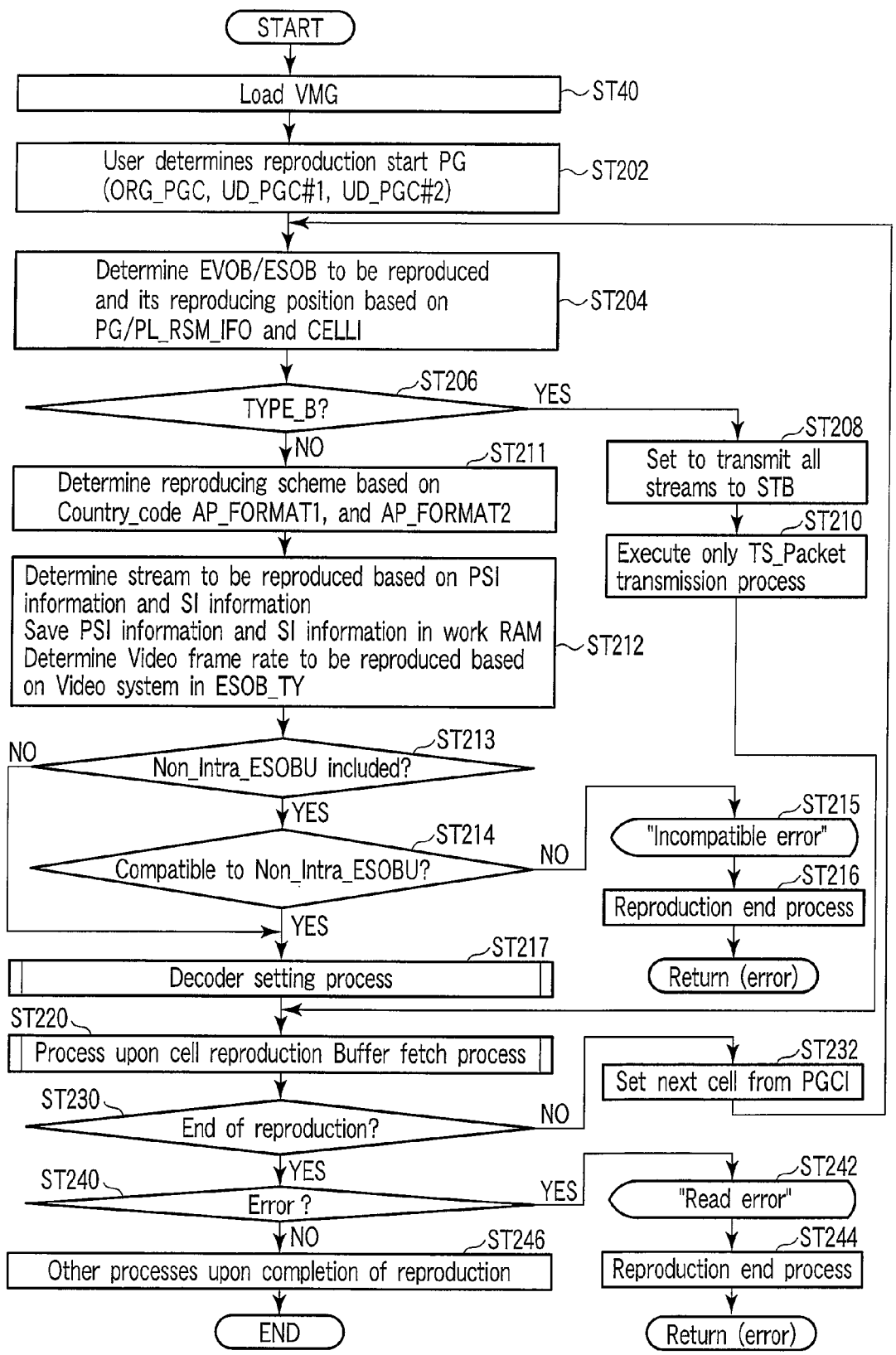
FIG. 23 is an exemplary flowchart for explaining an example of a reproducing operation.

FIG. 23 is a flowchart for explaining an example of the reproducing operation. The data processes upon reproduction are as follows.

61) MPU unit 80 loads a VMG file (ST40) and determines programs and cells to be reproduced (by prompting the user to select them) (ST202). In this case, if reproducing processing in the recorded order is selected, reproduction is made according to ORG_PGCI; if reproducing processing for each program is to be made, reproduction is made according to UD_PGC with a number corresponding to the program to be reproduced.

62) MPU unit 80 reads out the value of PKT_TY to check if a broadcasting scheme is compatible. If a broadcasting scheme is incompatible, MPU unit 80 displays a message that advises accordingly and ends the processing. (Or the control advances to the process for the next cell).

63) MPU unit 80 determines an ESOB or EVOB to be reproduced, playback start PTM, and the like based on title information to be reproduced (if PSI information and SI information are unknown, MPU unit 80 sets to execute only the transfer process to the STB), resume information (PL_RSM_IFO, PG_RSM_IFO), and the like, and determines a playback start file pointer (logical address) and ESI of a stream to be reproduced based on the playback start PTM (ST204).

64) MPU unit 80 checks type A or type B (ST206). In the case of type B (YES in ST206), MPU unit 80 sets to transfer all streams to the STB (ST208) and to execute the transmission process of TS packet alone (ST210). The process then jumps to block ST220.

65) In the case of type A (NO in ST206), MPU unit 80 determines a broadcasting scheme based on COUNTRY_CODE, AP_FORMAT1, and AP_FORMAT2 (ST211). (For example, USA and South Korea adopt ARIB. On the other hand, Japan and Brazil adopt ISDB.)

66) MPU unit 80 makes preparation for reproduction by determining a frame rate based on ESOB_TY/Video System (FIG. 6 etc.), and making initial settings of the respective decoder units based on STI and ESI values (ST212).

67) MPU unit 80 checks based on the value of ESOB_TY/SOBU_MODE if a stream includes a Non-Intra ESOBU. If a stream includes a Non-Intra ESOBU (YES in ST213), and if a recorder does not support such Non-Intra ESOBU (NO in ST214), MPU unit 80 displays an alert dialog "no support for reproduction of this stream" or the like (ST215), thus ending this processing (ST216).

68) If a stream does not include any Non-Intra ESOBU (NO in ST213) or if the recorder supports the Non-Intra ESOBU even if the stream includes such Non-Intra ESOBU (YES in ST214), MPU unit 80 executes a playback start process.

69) MPU unit 80 makes settings of the respective decoders (ST217).

70) MPU unit 80 executes a cell reproducing process (ST220), and checks if reproduction is to end (ST230). If reproduction is to end (YES in ST230), MPU unit 80 executes an error check process. If any error is found (YES in ST240), MPU unit 80 displays a message that advises accordingly (ST242), and ends the reproducing process (ST244). If no error is found (NO in ST240), MPU unit 80 executes a normal reproduction end process (ST246), thus ending this operation.

71) If reproduction is not to end (NO in ST230), MPU unit 80 determines the next cell based on the PGCI (ST232), and checks if the decoder settings have been changed. The process then returns to blocks ST204 to ST212. If the decoder settings have been changed, MPU unit 80 sets changed attributes in the decoders so as to change the decoder settings in response to the next sequence end code (ST217).

Supplemental Note 1 Associated with Embodiment

Management information is recorded to record attributes of data of the digital stream signal. This management information records ESOB stream information (ESOB_ESI in FIGS. 5 to 7) used to record ESOB attributes. The management information also records ESOBU entries (ESOBU_ENT in FIGS. 4 and 12) to record ESOBU attributes.

Supplemental Note 2 Associated with Embodiment

The digital stream signal is an MPEG-TS including H.264 video data packed in PES packets.

Supplemental note 2 Associated with Embodiment

The streamer (FIG. 13) that records digital streams has a function of acquiring and cognizing a component descriptor from an MPEG-TS. This streamer has a function of acquiring and cognizing PES packets from an MPEG-TS. This streamer further has a function of acquiring and cognizing a sequence parameter set (SPS) from H.264 video data. The streamer is configured to generate ESOB_ESI, ESOBU_ENTs, and the like based on the cognition results.

Correspondence Between Embodiment and Invention (1) Data of a digital stream signal compatible to an MPEG transport stream is segmented into one or more objects (ES-OBs), each object (ESOB) includes data units (ESOBUs) configured with reference to one or more picture access units or data of a reproduction time of not more than predetermined seconds (2.002 seconds), and one data unit (ESOBU) is configured by a packet group unit that groups a plurality of transport stream packets. A recording medium (optical disc, HDD, etc.) according to the embodiment is configured to have a data area that records a digital stream signal including video data of MPEG-4 AVC or H.264 as the digital stream signal compatible to the MPEG transport stream, and a management area that records management information (HDVR_MG in FIG. 3 including ESTR_FIT) of the data area. A recording method using the recording medium with this configuration comprises:

acquiring information from a component descriptor, a PES packet header, or a sequence parameter set in a program map table (PMT) included in the digital stream signal (ST1211 in FIG. 17, ST12111 in FIG. 21; or ST1600 in FIG. 22), and determining video attribute information of the object and/or attribute information of the data unit (ST12112 to S12119 in FIG. 21, ST1211 in FIG. 17, ST120 in FIG. 16; or ST1601 to ST1611 in FIG. 22, ST160 in FIG. 16);

recording the object (ESOB) on the data area for each data unit (ESOBU) (ST130 to ST160 in FIG. 16); and recording management information (HDVR_MG in FIG. 3 including ESOB_U_ESI in FIG. 7) that manages the object (ESOB) recorded on the data area (ST150 in FIG. 16).

(2) The video attribute information (V_ATR) includes resolution information (Source resolution), and the resolution information (Source resolution) can be determined from information (picture_width_in_mbs_minus1) in the component descriptor and the sequence parameter set (SPS in FIG. 20) in the program map table (PMT) (ST12111, ST12118 to 12119 in FIG. 21).

(3) The video information (V_ATR) includes aspect ratio information (Aspect Ratio) or progressive mode information (Source picture Progressive mode) indicating progressive or interlaced, and the aspect ratio information (Aspect Ratio) and/or the progressive mode information (Source picture Progressive mode) can be determined from description contents in the component descriptor in the program map table (PMT) (ST12112 and/or ST12113 in FIG. 21).

(4) The data unit (ESOBU; ENTRY_ESOBU in FIG. 9) includes reference picture information (information of I-picture, etc.), and a size (1 st_Ref_PIC_SZ in FIG. 12) of the first reference picture information in the data unit (ESOBU) can be determined from information (PTS, etc.) in the PES packet header (PPH in FIG. 18 or 19) or a position of the PES packet header (PPH in FIG. 18 or 19) (ST1604 in FIG. 22).

(5) A playback time (ESOBU_PB_TM in FIG. 12) of the data unit (ESOBU) can be determined from a presentation time stamp (PTS (not shown)) in the PES packet header (PPH in FIG. 18 or 19) (ST1608 in FIG. 22).

(6) When there are a plurality of access units (GOPs) of the digital stream signal including the sequence parameter set (SPS in FIG. 20), a unit (ESOBU itself) of the data unit can be determined from the positions (head positions of two GOPs including SPS) of the two successive access units (ST1609 to ST1611 in FIG. 22).

(7) The size (ESOBU_SZ in FIG. 12) of the data unit (ESOBU) can be determined from the position of the sequence parameter set (SPS in FIG. 20) (ST1609 to ST1611 in FIG. 22).

(8) Using the recording medium on which a digital stream signal is recorded by the method of (1), the management information is read from the management area (ST40), and the digital stream signal can be reproduced from the data area (ST211 to ST220) based on the read management information (ST204).

(9) A recording apparatus of using, in a case in which data of a digital stream signal compatible to an MPEG transport stream is segmented into one or more objects, each object includes data units configured with reference to one or more picture access units or data of a reproduction time of not more than predetermined seconds, and one data unit is configured by or corresponds to a packet group unit that groups a plurality of transport stream packets, a recording medium configured to have a data area that records a digital stream signal including video data of MPEG-4 AVC or H.264 as the digital stream signal compatible to the MPEG transport stream, and a management area that records management information of the data area, the apparatus comprises:

a unit (MPU which executes ST12112 to ST12119 in FIG.21 or ST1601 to ST1611 in FIG. 22, etc.) configured to acquire information from a component descriptor, a PES packet header, or a sequence parameter set in a program map table (PMT) included in the digital stream signal, and to determine video attribute information of the object and/or attribute information of the data unit;

a unit (MPU in FIG. 13 which executes ST130 to ST160 in FIG. 16, etc.) configured to record the object (ESOB) on the data area for each data unit (ESOBU); and a unit (MPU in FIG. 13 which executes ST150 in FIG. 16, etc., disc drive unit) configured to record management information (HDVR_MG in FIG. 3 including ESOB_U_ESI in FIG. 7) that manages the object (ESOB) recorded on the data area.

(10) A reproducing apparatus of using, in a case in which data of a digital stream signal compatible to an MPEG transport stream is segmented into one or more objects, each object includes data units configured with reference to one or more picture access units or data of a reproduction time of not more than predetermined seconds, and one data unit is configured by or corresponds to a packet group unit that groups a plurality of transport stream packets, a recording medium configured to have a data area that records a digital stream signal including video data of MPEG-4 AVC or H.264 as the digital stream signal compatible to the MPEG transport stream, and a management area that records management information of the data area, the management information including video attribute information of the object and attribute information of the data unit which are set based on a component descriptor, a PES packet header, or a sequence parameter set in a program map table (PMT) included in the digital stream signal, the apparatus comprises:

a unit (MPU in FIG. 13 which executes ST40, etc.) configured to read the management information from the management area; and a unit (MPU in FIG. 13 which executes ST211 to ST220, etc, disc drive unit, decoder unit) configured to reproduce the digital stream signal from the data area based on the read management information (ST204).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modification as would fall within the scope and spirit of the inventions.

What is claimed is:

1. A method of recording a digital stream signal on a recording medium comprising a data area configured to store the digital stream signal including video data of MPEG-4 AVC or H.264 standard and a management area configured to store management information for managing the digital stream signal, wherein the digital stream signal includes a data structure comprising an access unit delimiter, a sequence parameter set, a picture parameter set, a supplemental enhancement information, and a slice, the method comprising:
acquiring a component type from a program map table included in the digital stream signal to detect a vertical resolution of the video data;
acquiring a packet of the MPEG-4 AVC or H.264 standard from the digital stream signal, and checking if the packet includes the sequence parameter set;
acquiring a value of the sequence parameter set when the packet includes the sequence parameter set, to calculate a horizontal resolution of the video data;
determining a video resolution of the video data from the calculated horizontal resolution and the detected vertical resolution;
recording the digital stream signal on the data area; and
recording the management information that manages the recorded digital stream signal on the management area.

2. A method of reproducing a digital stream signal from a recording medium comprising a data area configured to store the digital stream signal including video data of MPEG-4 AVC or H.264 standard and a management area configured to store management information for managing the digital stream signal, wherein the digital stream signal includes a data structure comprising an access unit delimiter, a sequence parameter set, a picture parameter set, a supplemental enhancement information, and a slice, and wherein a component type is acquired from a program map table included in the digital stream signal to detect a vertical resolution of the video data,
a packet of the MPEG-4 AVC or H.264 standard is acquired from the digital stream signal, and it is checked if the packet includes the sequence parameter set,
a value of the sequence parameter set is acquired when the packet includes the sequence parameter set, to calculate a horizontal resolution of the video data,
a video resolution of the video data is determined from the calculated horizontal resolution and the detected vertical resolution,
the digital stream signal is recorded on the data area, and
recording the management information that manages the recorded digital stream signal is recorded on the management area,
the method comprising:
reading the management information from the management area; and
reproducing the digital stream signal from the data area based on the read management information.

3. A recording apparatus using a recording medium comprising a data area configured to store a digital stream signal including video data of MPEG-4 AVC or H.264 standard and a management area configured to store management information for managing the digital stream signal, wherein the digital stream signal includes a data structure comprising an access unit delimiter, a sequence parameter set, a picture parameter set, a supplemental enhancement information, and a slice, the apparatus comprising:
a unit configured to acquire a component type from a program map table included in the digital stream signal to detect a vertical resolution of the video data;
a unit configured to acquire a packet of the MPEG-4 AVC or H.264 standard from the digital stream signal, and checking if the packet includes the sequence parameter set;
a unit configured to acquire a value of the sequence parameter set when the packet includes the sequence parameter set, to calculate a horizontal resolution of the video data;
a unit configured to determine a video resolution of the Video data from the calculated horizontal resolution and the detected vertical resolution;
a unit configured to record the digital stream signal on the data area; and
a unit configured to record the management information that manages the recorded digital stream signal on the management area.

4. A reproducing apparatus using a recording medium comprising a data area configured to store a digital stream signal including video data of MPEG-4 AVC or H.264 standard and a management area configured to store management information for managing the digital stream signal, wherein the digital stream signal includes a data structure comprising an access unit delimiter, a sequence parameter set, a picture parameter set, a supplemental enhancement information, and a slice, and wherein a component type is acquired from a program map table included in the digital stream signal to detect a vertical resolution of the video data,
a packet of the MPEG-4 AVC or H.264 standard is acquired from the digital stream signal, and it is checked if the packet includes the sequence parameter set,
a value of the sequence parameter set is acquired when the packet includes the sequence parameter set, to calculate a horizontal resolution of the video data
a video resolution of the video data is determined from the calculated horizontal resolution and the detected vertical resolution,
the digital stream signal is recorded on the data area, and
recording the management information that manages the recorded digital stream signal is recorded on the management area,
the apparatus comprising:
a unit configured to read the management information from the management area; and
a unit configured to reproduce the digital stream signal from the data area based on the read management information.

* * * * *